United States Patent
Mecozzi

(10) Patent No.: US 10,914,316 B1
(45) Date of Patent: Feb. 9, 2021

(54) PLENUM FAN

(71) Applicant: ClimateCraft, Inc., Oklahoma City, OK (US)

(72) Inventor: Walter P. Mecozzi, Edmond, OK (US)

(73) Assignee: ClimateCraft, Inc., Oklahoma City, OK (US)

( * ) Notice: Subject to any disclaimer, the term of this patent is extended or adjusted under 35 U.S.C. 154(b) by 396 days.

(21) Appl. No.: 15/215,854

(22) Filed: Jul. 21, 2016

Related U.S. Application Data

(63) Continuation of application No. 13/589,772, filed on Aug. 20, 2012, now abandoned.
(Continued)

(51) Int. Cl.
 *F04D 29/42* (2006.01)
 *F04D 17/16* (2006.01)
 (Continued)

(52) U.S. Cl.
 CPC ......... *F04D 29/4226* (2013.01); *F04D 17/16* (2013.01); *F04D 29/281* (2013.01); *F04D 29/441* (2013.01)

(58) Field of Classification Search
 CPC ...... F04D 17/16; F04D 19/002; F04D 29/083; F04D 29/162; F04D 29/161; F04D 29/281; F04D 29/30; F04D 29/326; F04D 29/384; F04D 29/4226; F04D 29/4253; F04D 29/4206; F04D 29/44; F04D 29/441;
 (Continued)

(56) References Cited

U.S. PATENT DOCUMENTS 416,070 A 11/1889 Pelzer
753,986 A 3/1904 Krogh et al.
(Continued)

FOREIGN PATENT DOCUMENTS

| CA | 2287807 | 10/2007 |
|----|---------|---------|
| EP | 419798  | 4/1991  |
| MX | 215422  | 7/2003  |

OTHER PUBLICATIONS

Lowe et al., "U.S. Adoption of High-Efficiency Motors and Drives: Lessons Learned," *Center on Globalization, Governance and Competitiveness, Duke University*, 2011-2015 (Feb. 25, 2010) (56 pages).
(Continued)

*Primary Examiner* — David E Sosnowski
*Assistant Examiner* — Wayne A Lambert
(74) *Attorney, Agent, or Firm* — Neal, Gerber & Eisenberg LLP; Thomas E. Williams

(57) ABSTRACT

An improved plenum fan for use in air handling systems. The inlet cone is first in line in the direction of airflow. It is attached to the back plate, which is in between the fan wheel and the inlet cone. The fan wheel mates with the back plate through a non-contacting labyrinth seal. The wheel inlet and outlet are both cone-shaped so that the air channels between the fan blades are tilted towards the direction of airflow. The back plate is positioned behind inlet cone to permit a pressure sensor to be mounted on the inlet side of the back plate and to permit a fixed pressure tap to be connected on the inlet cone. Thus, a short conduit may be connected to the low side of the differential pressure gauge or sensor without passing through the fan back plate.

15 Claims, 19 Drawing Sheets

Related U.S. Application Data

(60) Provisional application No. 61/526,528, filed on Aug. 23, 2011.

(51) Int. Cl.
*F04D 29/28* (2006.01)
*F04D 29/44* (2006.01)

(58) Field of Classification Search
CPC .... F04D 29/541; F04D 29/601; F04D 29/602; F04D 29/626; F04D 29/646
USPC ... 415/172.1, 147.5, 204, 206, 208.1, 213.1, 415/214.1, 218.1, 219.1; 416/186 R, 416/223 B, 188
See application file for complete search history.

(56) References Cited

U.S. PATENT DOCUMENTS

| | | | |
|---|---|---|---|
| 815,540 A | 3/1906 | Krogh | |
| 971,850 A * | 10/1910 | Krogh | F04D 29/167 |
| | | | 277/352 |
| 1,058,592 A | 4/1913 | Jacobsen | |
| 1,090,073 A | 3/1914 | Kieser | |
| 1,787,656 A | 1/1931 | Anderson | |
| 1,820,150 A | 8/1931 | Moody | |
| 1,978,459 A * | 10/1934 | Hegan | F04D 29/424 |
| | | | 415/201 |
| 2,209,607 A * | 7/1940 | Nutting | B01D 45/14 |
| | | | 55/407 |
| 2,284,141 A * | 5/1942 | Funk | F04D 29/281 |
| | | | 415/218.1 |
| 2,316,608 A * | 4/1943 | McMahan | F04D 25/082 |
| | | | 415/204 |
| 2,329,696 A * | 9/1943 | Chester | F04D 29/282 |
| | | | 416/188 |
| 2,652,191 A | 9/1953 | Buchi | |
| 2,665,841 A * | 1/1954 | Smith | F04D 17/165 |
| | | | 126/110 R |
| 2,936,141 A * | 5/1960 | Rapata | F16C 27/02 |
| | | | 248/604 |
| 3,064,879 A | 11/1962 | Carlson | |
| 3,069,071 A | 12/1962 | Carlson | |
| 3,144,859 A * | 8/1964 | Walton | F01P 5/06 |
| | | | 123/41.49 |
| 3,161,388 A * | 12/1964 | Appleton | F24F 7/013 |
| | | | 248/208 |
| 3,425,621 A * | 2/1969 | Greenheck | F04D 17/165 |
| | | | 415/201 |
| 3,515,498 A | 6/1970 | Tomita | |
| 3,584,968 A | 6/1971 | Keith | |
| 3,600,655 A | 8/1971 | Karlin et al. | |
| 3,627,440 A * | 12/1971 | Wood | F04D 29/4226 |
| | | | 415/58.3 |
| 3,650,633 A | 3/1972 | Benoit | |
| 3,782,851 A | 1/1974 | Hackbarth et al. | |
| 3,829,250 A * | 8/1974 | Samson, Jr. | F04D 17/16 |
| | | | 415/206 |
| 4,092,088 A | 5/1978 | Nemesi | |
| 4,213,426 A * | 7/1980 | Longhouse | F01P 5/06 |
| | | | 123/41.49 |
| 4,227,868 A | 10/1980 | Nishikawa et al. | |
| 4,432,694 A | 2/1984 | Kuroda et al. | |
| 4,522,160 A | 6/1985 | Speers et al. | |
| 4,568,243 A * | 2/1986 | Schubert | F04D 29/023 |
| | | | 248/570 |
| 4,647,271 A | 3/1987 | Nagai et al. | |
| 4,798,518 A | 1/1989 | Holzberger et al. | |
| 4,917,572 A | 4/1990 | Van Houten | |
| 4,955,762 A | 9/1990 | Hardman | |
| 5,209,639 A | 5/1993 | Neuber et al. | |
| 5,215,437 A * | 6/1993 | TeVelde | F01D 9/04 |
| | | | 415/182.1 |
| 5,352,089 A | 10/1994 | Tokunaga et al. | |
| 5,551,838 A * | 9/1996 | Hugbart | F04D 29/4213 |
| | | | 415/206 |
| 5,584,614 A | 12/1996 | Aidlin et al. | |
| 5,586,861 A | 12/1996 | Berger | |
| 5,695,318 A * | 12/1997 | Harmsen | F04D 17/06 |
| | | | 415/218.1 |
| 5,749,702 A | 5/1998 | Datta et al. | |
| 5,810,557 A | 9/1998 | Akinkuotu et al. | |
| 6,023,899 A | 2/2000 | Mecozzi | |
| 6,039,535 A | 3/2000 | Kobayashi et al. | |
| 6,039,539 A * | 3/2000 | Berg | F04D 29/282 |
| | | | 415/119 |
| 6,426,605 B1 | 7/2002 | Toliyat et al. | |
| 6,469,469 B1 | 10/2002 | Chambers et al. | |
| 6,929,452 B1 * | 8/2005 | Pargeter | F04D 29/281 |
| | | | 415/912 |
| 6,964,555 B2 * | 11/2005 | Ochiai | F01D 9/026 |
| | | | 415/204 |
| 7,048,499 B2 | 5/2006 | Mathson et al. | |
| 7,189,053 B2 * | 3/2007 | Winkler | B29C 45/0062 |
| | | | 415/108 |
| 7,244,099 B2 * | 7/2007 | Yamasaki | F04D 29/162 |
| | | | 415/173.6 |
| 7,748,954 B2 | 7/2010 | Eguchi et al. | |
| 7,758,305 B2 * | 7/2010 | Kurszewski | F04D 29/162 |
| | | | 415/205 |
| 7,963,749 B1 | 6/2011 | Mecozzi | |
| 8,534,346 B1 | 9/2013 | Mecozzi | |
| 8,814,639 B1 | 8/2014 | Mecozzi | |
| 8,915,698 B2 * | 12/2014 | Jeon | F04D 29/162 |
| | | | 415/119 |
| 9,677,782 B1 | 6/2017 | Mecozzi | |
| 2002/0028138 A1 * | 3/2002 | Lee | F04D 29/023 |
| | | | 415/206 |
| 2005/0223720 A1 | 10/2005 | Miller et al. | |
| 2007/0273234 A1 | 11/2007 | Melfi | |
| 2009/0109713 A1 | 4/2009 | Schnetzka et al. | |
| 2009/0171512 A1 | 7/2009 | Duncan | |
| 2010/0193163 A1 | 8/2010 | Rollins et al. | |
| 2011/0018350 A1 | 1/2011 | Harhay et al. | |
| 2011/0064571 A1 * | 3/2011 | Lind | F04D 29/4213 |
| | | | 415/206 |
| 2011/0149678 A1 | 6/2011 | Southwick et al. | |
| 2012/0211205 A1 * | 8/2012 | Eguchi | F04D 29/281 |
| | | | 165/121 |
| 2012/0326640 A1 | 12/2012 | Northup | |

OTHER PUBLICATIONS

McCoy et al., "BPA Report Summary," *Energy-Efficient Electric Motor Selection Handbook* (Jan. 1993) (65 pages).

Michael J. Melfi, "Quantifying the energy efficiency of motors on inverters," *IEEE Industry Applications Magazine*, 37-43 (2011) (7 pages).

National Electrical Manufacturers Association, "NEMA MG-1: Motors and Generators" (2009) (Sections 12.60 to 12.61, part 12, pp. 32-38; Sections 14.34 to 14.35, part 14, pp. 9-10; Sections 30.0 to 30.2, part 30, pp. 1-12; Sections 31.0 to 31.7, part 31, pp. 1-14) (671 pages).

Bezesky et al., "NEMA Application Guide for AC adjustable speed drive systems." *Petroleum and Chemical Industry Conference, 2001. IEEE Industry Applications Society 48th Annual.* (2001) (10 pages).

Forsman et al., "Motor Efficiency, Selection, and Management, A Guidebook for Industrial Efficiency Programs," Pacific Gas and Electric Company and Consortium for Energy Efficiency (2011) (36 pages).

Daniel R. Snyder, "The Meaning of Bearing Life," *Machine* Design: 86-92 (Apr. 12, 2007) (3 pages).

Yaskawa Electric America Inc., "Induction Motor Speed Torque Characteristics," *A World of Automation Solutions* (2006) (7 pages).

Howard E. Jordan., "Energy Efficient Electric Motors and Their Application" *Van Nostrand Reinhold Company Inc.* (1983) (section 3.5-3.6, pp. 34-42; section 4.1-4.4, pp. 62-76; section 7.1-7.6, pp. 108-132) (54 pages).

(56) References Cited

OTHER PUBLICATIONS

Tom Cox Lloyd, "Electric Motors and Their Applications," *John Wiley & Sons* (1969) (Chapters 1-2, pp. 1-33; Chapters 4-5 pp. 44-108; Chapter 12, pp. 199-215; Chapter 18, pp. 291-299) (66 pages).

GE Industrial Systems, "AC Motor Selection and Application Guide" (32 pages).

\* cited by examiner

Premium Motor Efficiency Table

*Data extracted from NEMA MG1 table xxxxxx*
*Minimum nominal motor efficiency*

| HP | 2 Pole | 4 Pole | 6 Pole |
|---|---|---|---|
| 5 | 86.5 | 89.5 | 90.2 |
| 7 1/2 | 88.5 | 91.0 | 90.2 |
| 10 | 89.5 | 91.7 | 91.7 |
| 15 | 90.2 | 93.0 | 91.7 |
| 20 | 91.0 | 93.0 | 92.4 |
| 25 | 91.7 | 93.6 | 93.0 |
| 30 | 91.7 | 94.1 | 93.6 |
| 50 | 93.0 | 94.5 | 94.1 |
| 100 | 93.6 | 95.4 | 95.0 |

*FIG. 19*

PLENUM FAN

CROSS-REFERENCE TO RELATED APPLICATIONS

This application is a continuation of U.S. patent application Ser. No. 13/589,772, entitled "Plenum Fan," filed Aug. 20, 2012, which application claims the benefit of U.S. Provisional Application No. 61/526,528, entitled "Plenum Fan," filed Aug. 23, 2011, and the contents of both these applications are incorporated herein by reference.

FIELD OF THE INVENTION

The present invention generally relates to fans used in air handling or air delivery equipment for heating, ventilation, and air conditioning systems (HVAC).

BRIEF DESCRIPTION OF THE DRAWINGS

FIG. 19 is a table that shows the minimum nominal motor efficiency required to be rated as a premium efficiency motor by NEMA MG1 for 2-pole, 4-pole, 6-pole, and 8-pole motors and for 5, 7.5, 10 and 15 horsepower motors.

DETAILED DESCRIPTION OF THE PREFERRED EMBODIMENT(S)

Figure 1:
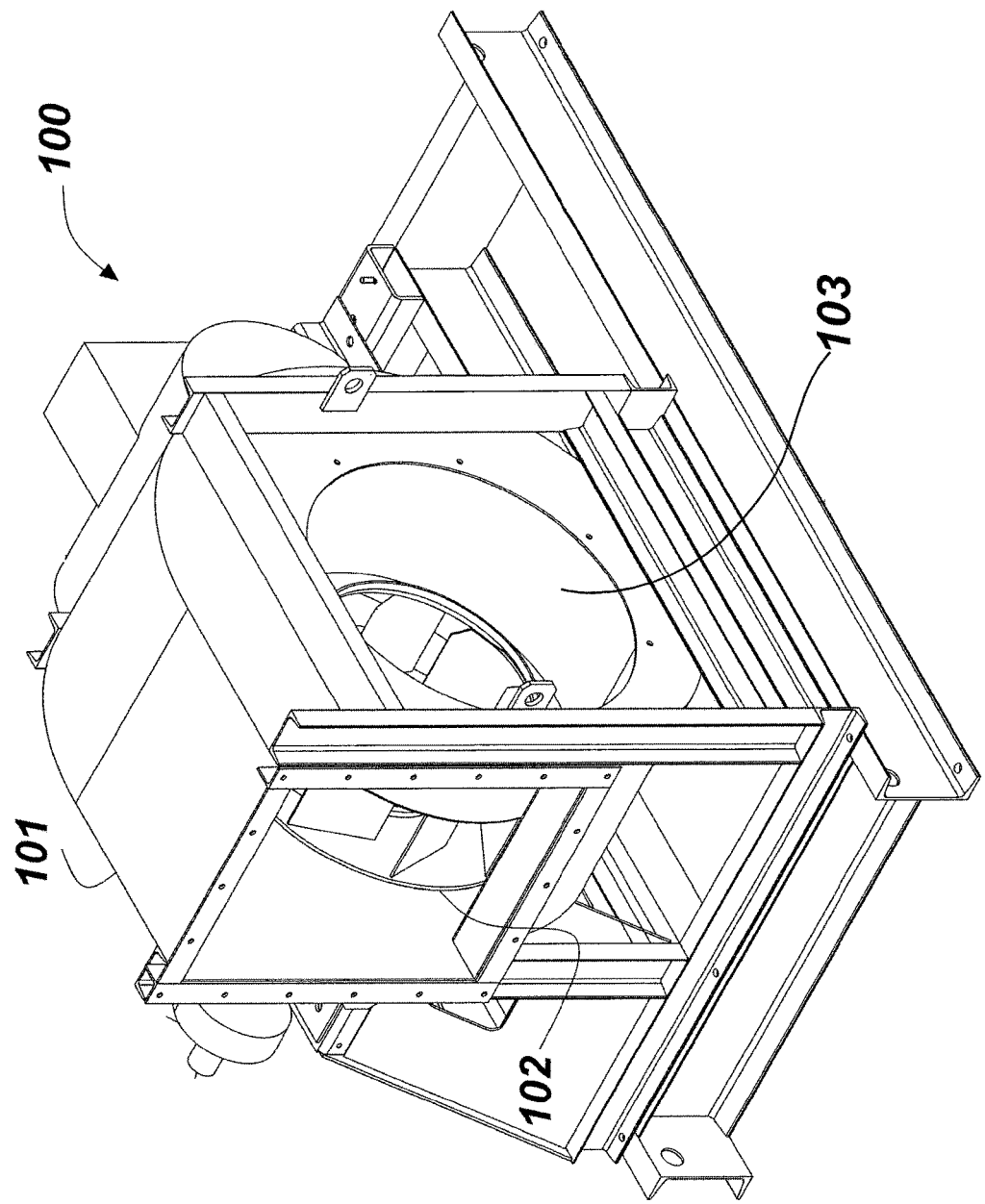
FIG. 1 is a prior art single width housed belt driven centrifugal fan with no outlet duct connected and the inlet funnel removed to show the wheel inlet.
Figure 2:
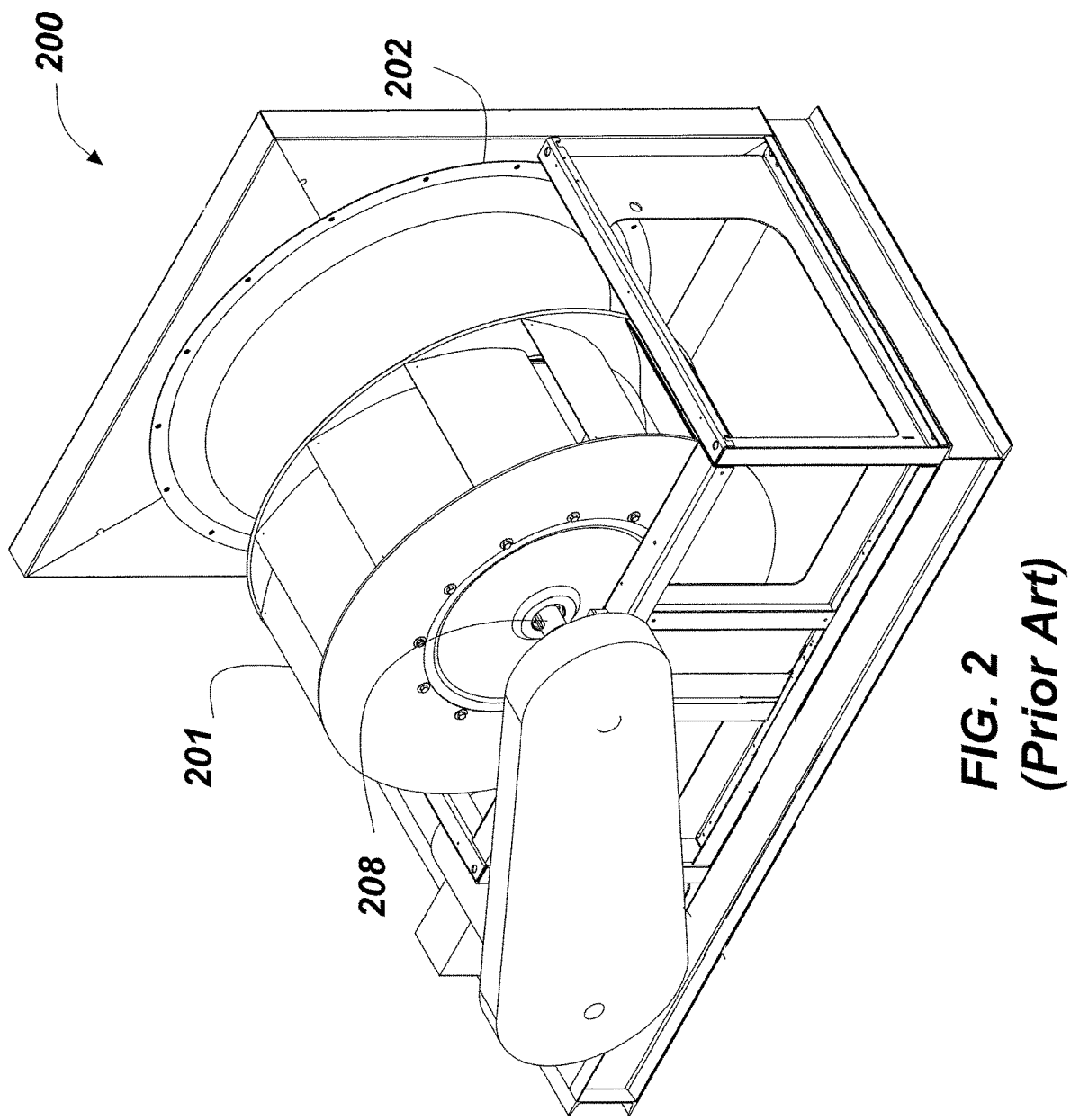
FIG. 2 is a prior art single width belt driven centrifugal plenum fan.

A typical plenum fan (200), shown in FIG. 2, is an un-housed centrifugal fan. It has a plurality of blades attached to a fan wheel (201) arranged in a backwardly inclined fashion about the axis of rotation (208). The blades are flat or airfoil shaped or curved single thickness blades shaped to approximate an airfoil shape. The blades are sandwiched between an inlet plate, with an opening in the center, and a back plate that are parallel to each other and normal to the axis of rotation. The plurality of fan blades, the inlet plate and the back plate are fastened together to form the rotating fan wheel (201). A stationary funnel shaped inlet cone (202) is positioned to direct air into an opening in the inlet plate in the same direction as the axis of rotation.

As the fan wheel rotates, the air that is in between the fan blades is forced out of the outer perimeter of the wheel by the centrifugal forces generated. The exit of the air between the blades leaves a void of air that is filled by pulling air through the inlet cone and into the wheel inlet plate. The air that enters the inlet cone accelerates as it passes through due to the funnel shape of the cone that reduces the area as it nears the rotating wheel along the axis of rotation. As the air leaves the inlet cone and enters the rotating wheel through the inlet plate, it is forced to change flow direction from axial to radial and is further accelerated as it passes through the fan blades.

By the time the air reaches the outer perimeter of the fan blades it is moving at tremendous velocity with correspondingly high momentum energy. When the air passes past the outer perimeter of the fan blades it slows down and the momentum energy of the air is converted to pressure. In this way the plenum fan can move the air and create pressure that will force the air through the air handling system of the building.

Early plenum fans were produced by simply removing the outer housings of single width single inlet housed fans (100). The wheels were designed to operate in a housing (101) that captured the air as it exited the wheel and directed it to a connection plate that allowed the fan assembly to be attached to a duct. The housing was usually shaped as an expanding volute around the wheel and it was designed to efficiently convert the high velocity air momentum energy into pressure.

Using the wheels designed for single width single inlet housed fans in plenum fan designs worked, but these plenum fans were less efficient than the housed fans for which the wheels were originally designed. The plenum fans could have up to ten percent (10%) less static efficiency than the housed fans. Despite this loss in efficiency plenum fans gradually replaced housed fans in air handling unit applications. Plenum fans had many advantages over housed fans when used inside of air handling units. They are quieter.

They have much lower downstream velocity due to the absence of the housing. This lower velocity reduces the internal losses of the air handling unit and reduces problems like water blow off on cooling coils located downstream from the fans. As the plenum fan designs gained greater acceptance, fan manufacturers improved the designs of the wheels. By concentrating on the aerodynamic shape and position of the blades, the design of the inlet cones and other key parameters of the fan wheel, plenum fans became more efficient and quieter. They can currently deliver air more efficiently than a comparably housed centrifugal fan when mounted inside of an air handling unit. They have become the most common type of fan used inside of large commercial air handling units for that reason.

During the same time period that large commercial air handling equipment has changed from predominantly using housed fans to predominantly using plenum fans, it has become very common to power those fans with variable speed drives. Variable speed drives (VSD) are electronic devices placed on the power line of three phase induction motors. They are able to control the frequency and voltage of the electrical power delivered to the motor. In that way they can control the rotational speed of the motor and the fan attached to it. They have become almost universal in usage on large commercial air handlers because they offer substantial benefits to the owners of the air handling equipment and have been steadily decreasing in price in recent years. They can substantially reduce the power consumption of the fans on variable air volume systems. They can compensate for filter loading. They can control building pressurization. They can offer many more benefits too numerous to mention here but well known to those skilled in the art.

Fans for large commercial air handling equipment and plenum fans in particular have historically been designed to be driven by electric motors through belt drive systems. When a manufacturer of plenum fans designed the fans they would generally create a line of geometrically similar fan wheels. A typical fan line may have wheels that range in diameter from 12 inches to over 90 inches. The fans in the line may be capable of air flow volume of 1000 cubic feet per minute (cfm) to over 100,000 cfm at pressures ranging from 0 to over 12 inches water column of static pressure. Due to manufacturing limitations there would be a limited number of discrete sizes in the line of fans. The fan manufacturer would select the wheel size increments carefully so that the line would efficiently cover the range of flow and pressure targeted for the fan line.

In order to apply a fan in an air handling system, a fan would be selected by a designer to deliver the flow and pressure he needs for his system. He would select the best size to fit his application and determine the fan speed and motor power required by that fan. The designer would consider the fan efficiency, the cost, and the range of operation required when making his selection. He will select one of the fan sizes that will deliver stable operation over the range of conditions he expects for the application. That selection will result in a design or maximum speed of rotation for the fan and require an electric motor of sufficient size to meet the fan power consumption. The rotational speed requirement can vary widely over the fan line. It could be anywhere from 100 revolutions per minute (rpm) to 5000 rpm for fans in a typical fan line. By connecting the motor to the fan through a belt drive, the fan manufacturer can satisfy this widely varying requirement for fan speeds with common motors. He could simply select the combination of belt drive pulley for the motor shaft and the fan shaft to give the fan rotational speed required. For the reasons stated above belt drives were the preferred method to drive plenum fans in large commercial air handling systems.

When a belt driven fan is used in combination with a VSD, there are two devices on the fan that affect the rotational speed of the fan. Designers realized that if a VSD was used, the belts could be eliminated and the motor could be mounted directly to the fan. Direct drive fans have significant benefits over belt driven fans. They are less expensive to manufacture. They eliminate the drive belts, the pulleys, the fan shaft and bearings. The fan frame can also be smaller and less complicated and less costly. Belts reduce the efficiency of the system because they contribute to frictional losses that can amount to 3% to 6% of the power consumed by the fan. These frictional losses end up as heat that the belts must dissipate to the atmosphere. Drive belts constantly wear because of this heat and the constant rotational flexing and tension on the belt. As a result, belts must be changed quite often during the life of the fan. If they are not changed, they will eventually break causing the air handling system to fail.

Direct drive fans have advantages, but the existing plenum fan lines designed for belt drives have some substantial limitations for this use. As stated earlier, these fans are designed to be geometrically similar and the designs typically follow similarity rules known as fan laws. These fan laws are well known to those skilled in the art. In general, as the fan diameter gets larger they are used to deliver more air. In a fan line or family of fans the smallest to the largest fans are called on to deliver a similar range of pressures. Larger fans must be turned at a slower speed than smaller fans to deliver similar pressures. This leads to some problems with matching motors to fans for direct drive applications. Since the motor shaft speed must equal the fan rotational speed in a direct drive fan, the motors must operate over a wider range of speeds than they would have to in a belt driven application.

Three phase induction motors are typically used to drive fans. The rotational speed of the motor is primarily determined by the frequency of the electrical power delivered to it and the number of poles in the motor windings. This determines the rotational speed of the electric field applied to the rotor of the motor. This rotational speed is the synchronous speed of the motor. The rotor runs at a slightly slower speed than the synchronous speed in order to develop enough torque to meet the power demand applied to it by the fan load. Motor manufacturers commonly offer motors with 2 pole, 4 pole, 6 pole, or 8 pole windings. Motors in the US are usually designed to operate and deliver full rated horsepower at 60 Hz. At 60 Hz, this results in synchronous speeds of 3600 rpm, 1800 rpm, 1200 rpm, and 900 rpm respectively. In Europe and other countries where electrical power is transmitted at 50 Hz, the resulting synchronous motor design speeds are 3000 rpm, 1500 rpm, 1000 rpm, and 450 rpm respectively.

When the speed of the motor is controlled by a VSD, the motor can deliver full power in a limited range. Normally the motor will deliver full power when the VSD delivers frequency from the motor's design frequency to about 1.5 times the motor's design frequency. For example, a modern 3 phase high efficiency 4 pole motor designed to produce 10 horsepower (HP) with 460 volt, 60 Hz power will deliver 10 HP when the VSD delivers frequency between 60 Hz to 90 Hz. Depending on the design of the motor the range of full power delivery will vary somewhat. In this range the VSD can deliver full voltage to the motor and the motor will not overheat. When the VSD delivers a frequency below the motor's design frequency, it must drop the voltage below the motor's design voltage or the motor will overheat. In this range the maximum voltage the drive can deliver and the maximum shaft power the motor can deliver is proportional to the delivered frequency. When the VSD delivers frequency below the motor's design frequency, the motor's maximum power output is reduced by the ratio of the delivered frequency to the motor design frequency. The example 10 HP motor can only deliver 7.5 HP at 45 Hz.

Because the larger fans run slower, it becomes more expensive to match the motor to the fan when the fans get larger. The more poles the motor has the heavier and more expensive it is to manufacture for any given shaft power delivery. That is, because more poles require more windings and the slower a motor runs the more torque it must produce for any given shaft power output. It takes more motor mass to produce more torque, which drives up the price of the motor. When the design speed of the fan is below the synchronous speed of an 8 pole motor, the motor will have to be de-rated to apply them at that slow speed, further increasing the cost and weight of the motor selection. In addition to problems of increased motor cost and weight, the fans get exponentially heavier as they get larger. The largest fans can be too heavy for the motor bearings. These problems with matching the motors to the fans have limited direct drive plenum fan applications to smaller fans and therefore smaller airflows.

In order to expand the benefits of direct drive plenum fans to larger air handling systems, fan arrays have become popular in large commercial air handlers. Instead of one or two large fans in a system, fan arrays use a larger number of smaller fans to deliver the same airflow. Arrays of plenum fans have been produced using as many as 30 to 40 direct drive fans in systems that deliver air volumes in excess of 200,000 cfm. The smaller fans run at faster speeds, overcoming the problems with heavy and costly low speed motors. In addition to the benefits of direct drive fans in large air handling equipment, fan arrays provide other benefits as well.

Because the smaller fans used in fan arrays run faster to produce comparable pressure, they have a better sound power spectrum. The large, low speed fans produce very high sound power levels in the first three octave bands, and it is very difficult to remove noise in these octave bands with conventional sound attenuation techniques due to their long wavelength. Smaller fans running at higher speeds produce less noise in the first three octave bands. They usually produce more noise in the fourth and fifth octave band, but it is much easier to attenuate noise in these bands.

The smaller fans used in fan arrays are shorter in the direction of airflow which reduces the length required for the air handling system. This saves space in the building and reduces the cost of the casing of the air handler. The smaller motors used in fan arrays weigh less and are easier to replace in the event of a motor failure. There is more redundancy with fan arrays increasing reliability. Small direct drive plenum fans used in fan arrays can be stacked horizontally and vertically, improving the airflow patterns of the air handler.

These many benefits are making air handling systems with fan arrays very popular with institutions and other long term owners of buildings. On currently designed plenum fan lines, the smallest of the fans tend to be less efficient than the larger fans. Using these smaller fans in fan arrays in place of the larger fans can reduce the efficiency of the air handling system. This is a significant disadvantage of fan array systems using current plenum fan technology.

Figure 5:
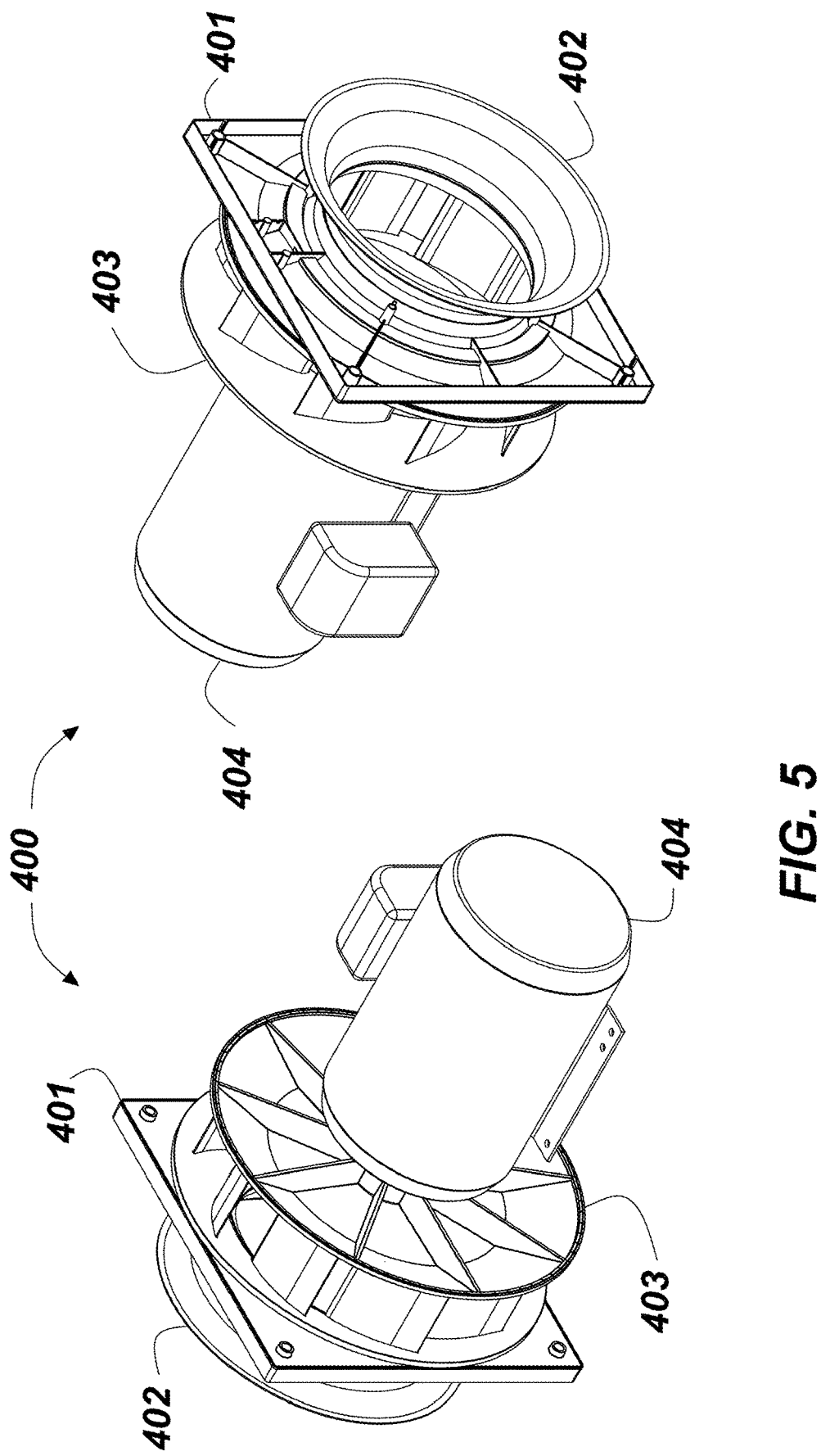
FIG. 5 is an improved direct driven plenum fan shown from the air inlet side and the air outlet side. The support structure has been removed to provide clarity for the fan construction. This fan is one preferred embodiment of this invention.
Figure 6:
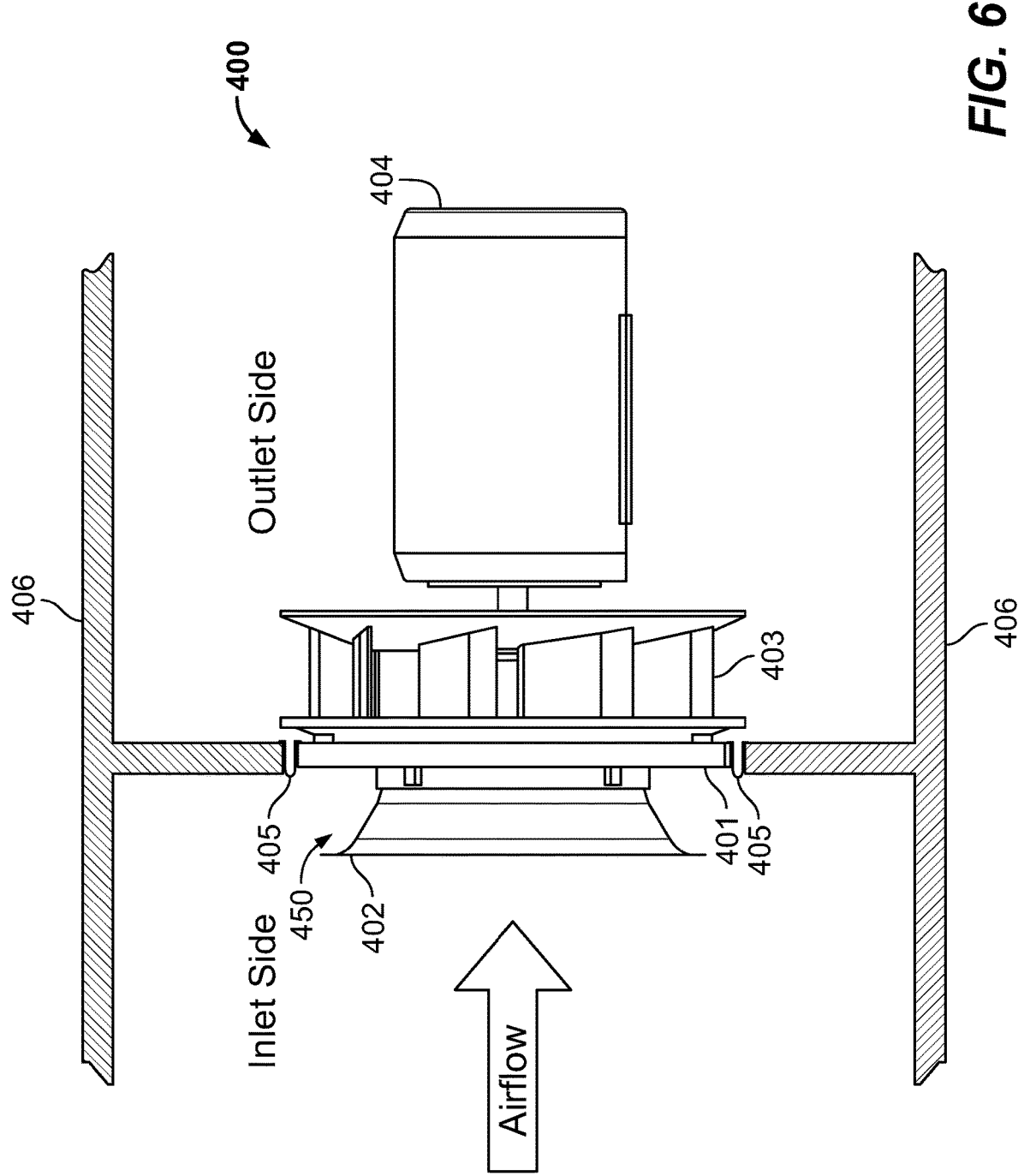
FIG. 6 is a side elevation of the improved plenum fan from FIG. 5 installed in an air handling unit cabinet to show how the cabinet connects to the back plate of the fan unit and separates the low pressure or inlet side from the high pressure or outlet side of the fan.
Figure 13:
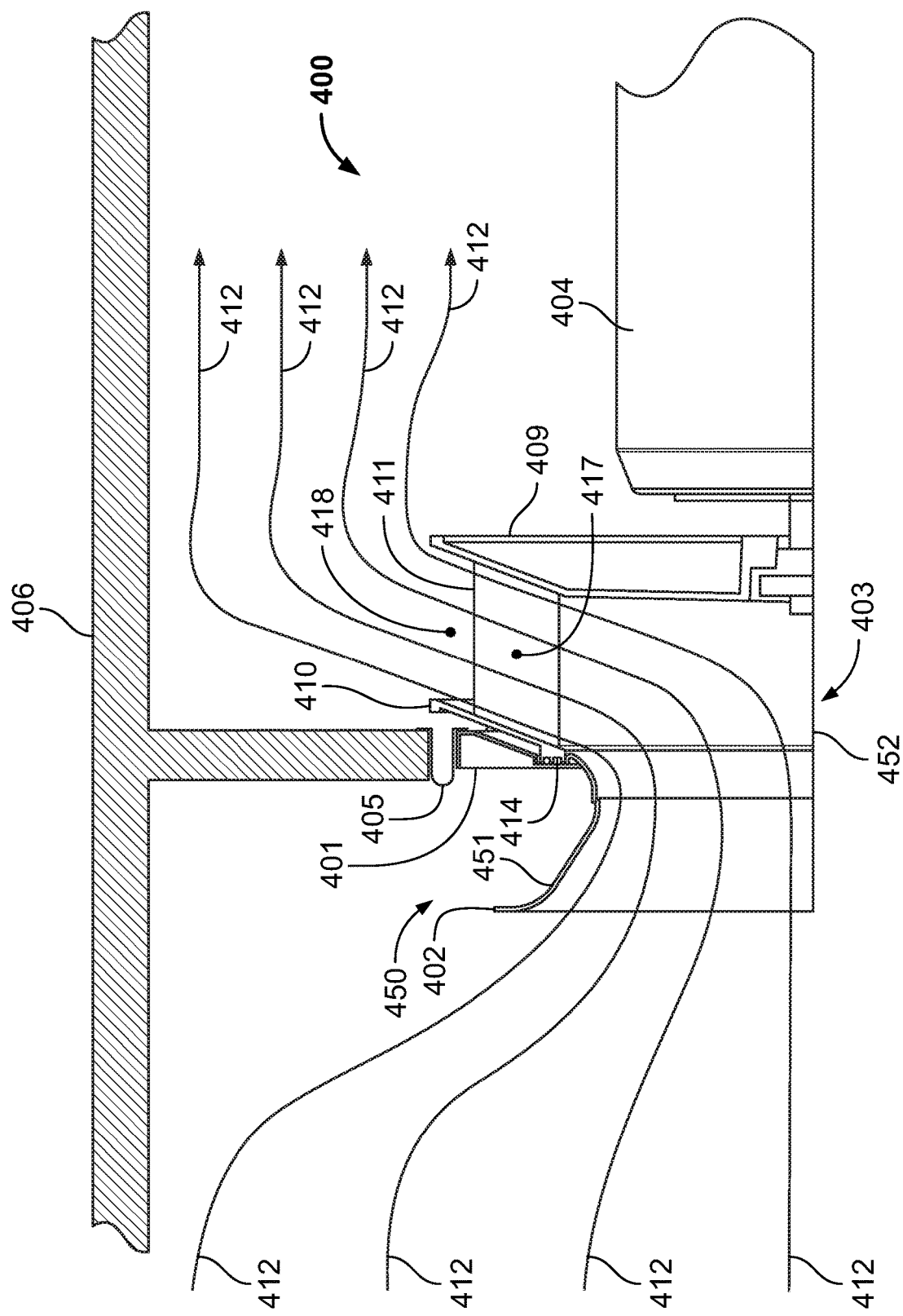
FIG. 13 is an enlargement of the section view of FIG. 12.

Turning to FIG. 5, which shows a preferred embodiment of this invention, we will describe the features of the current invention. FIG. 5 is an isometric drawing of the improved fan shown from the inlet and the outlet side of the fan unit (400). The fan unit (400) consists of a fan back plate (401), a fan inlet cone (402), a rotating fan wheel (403), and a fan motor (404). As shown in FIG. 13, the fan unit (400) includes a fan inlet (450) that defines a circular converging-diverging air flow duct (451). The air flow duct (451) extends along an air flow centerline (452) and includes a throat (453). The air flow duct (451) is formed from the fan inlet cone (402) and a diverging air expansion portion (454). As shown in FIGS. 6 and 13, the fan inlet cone (402) is a bell-mouthed converging air inlet portion. FIG. 6 shows this fan as it would be installed in a housing (406) which shows how the low pressure or inlet side of the fan unit (400) is separated from the high pressure or outlet side by connecting the back plate (401) to the housing (406) with a flexible membrane (405). As shown in FIG. 13, a mount member (455) is connected to a discharge end of the fan inlet cone (402) for mounting the fan unit (400) to a wall of the housing (406). The mount member (455) includes the back plate (401), the diverging air expansion portion (454), and a non-contacting labyrinth seal (414). The back plate (401), also referred to as a radially extending wall, is oriented transverse to the air flow centerline (452) for mounting the fan unit (400) to the wall of the housing (406). FIG. 13 also shows that the back plate (401) is positioned proximate to a discharge end of the diverging air expansion portion (454) and axially downstream of the throat (453). These diagrams are for illustrative purposes and do not show the supporting structure of the fan unit (400), motor (404), and fan wheel (403). It would be understood by one skilled in the art that a support structure would be necessary for the proper function of the fan unit (400). The details of the support structure are not included in the drawings to add clarity to the features of the present invention.

Figure 3:
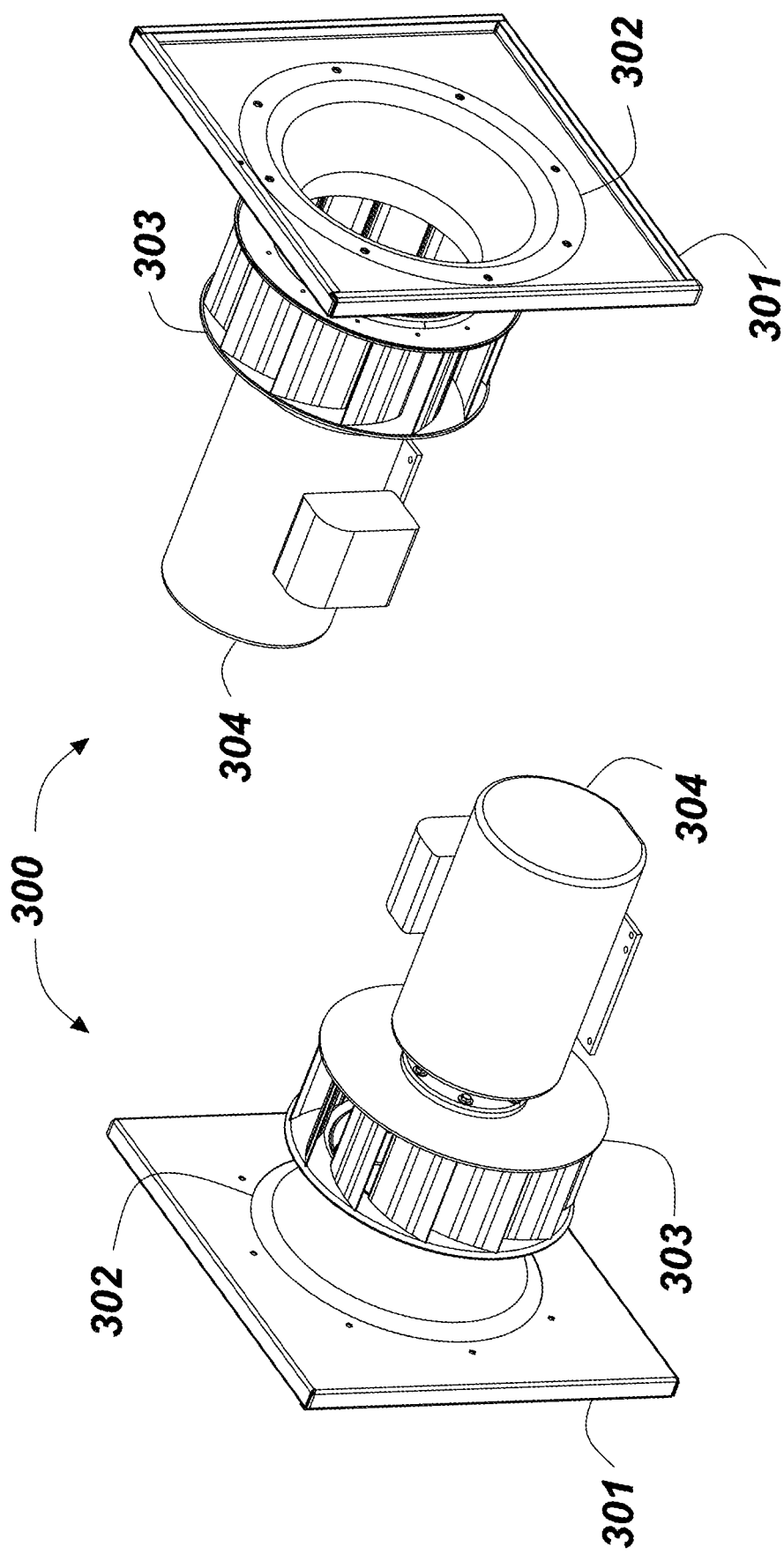
FIG. 3 is a prior art single width direct driven centrifugal plenum fan shown from the air inlet side and from the air outlet side. The support structure is removed to provide clarity for the fan construction. This fan is exemplary of the type that would be typically used in a prior art fan array.
Figure 4:
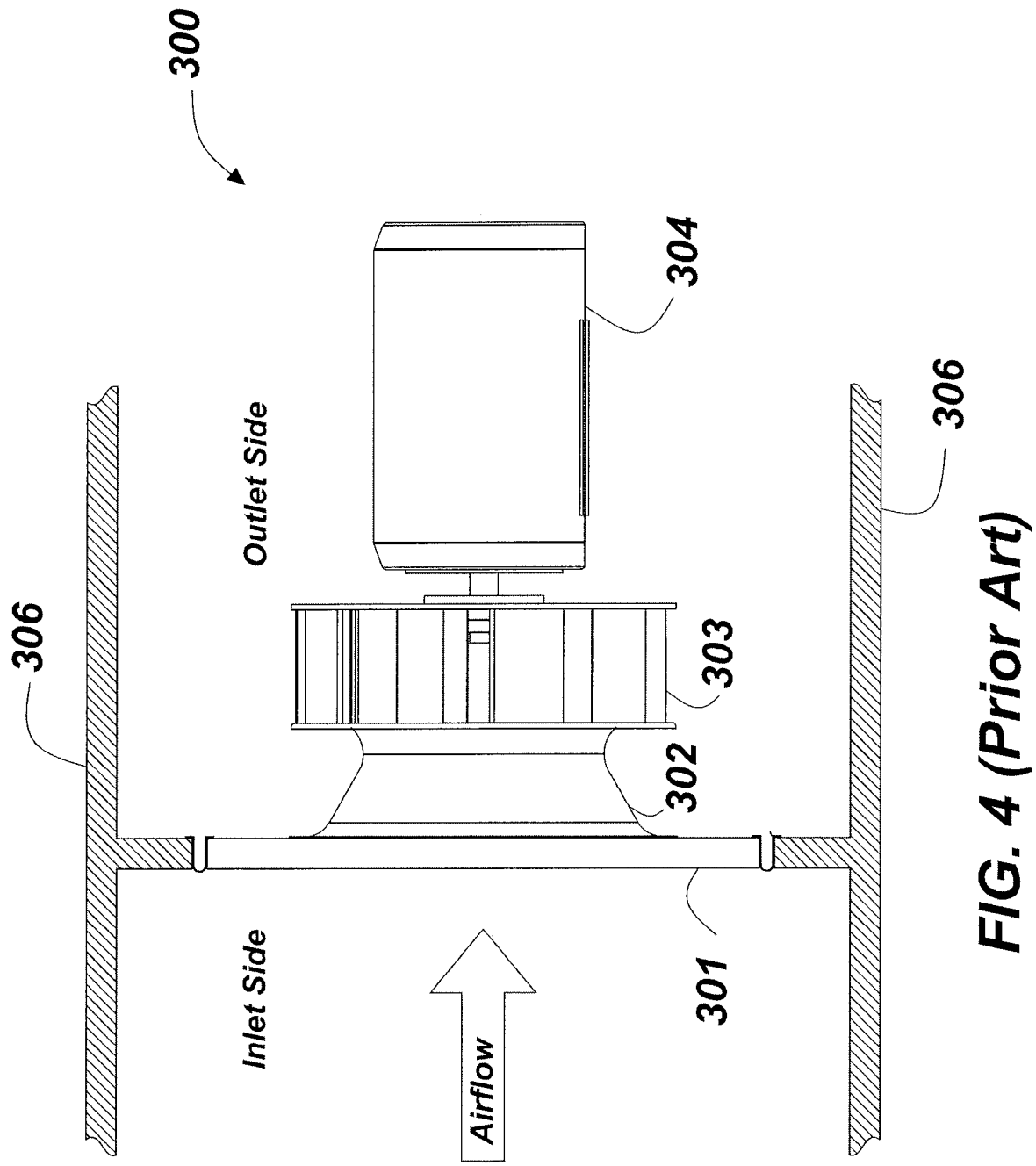
FIG. 4 is a side elevation of the prior art plenum fan from FIG. 3 installed in an air handling unit cabinet to show how the cabinet connects to the back plate of the fan unit and separates the low pressure or inlet from the high pressure or outlet side of the fan.

Comparing this new fan unit (400) to the prior art fan plenum fan unit (300) detailed in FIG. 3 and FIG. 4 you will notice several major differences.

The first significant difference is the location of the back plate (401) relative to the fan wheel (403) and the inlet cone (402). On the prior art plenum fan unit (300), the back plate (301) is first in line in the direction of the airflow. The inlet cone (302) is then attached to the back plate (301). The rotating fan wheel (303) is then positioned with its inlet plate (308) inserted over the edge of the inlet cone (302) creating an air gap (317) better illustrated in the section view drawings of FIG. 9, FIG. 10, and FIG. 11.

The inlet cone (402) of the improved fan unit (400) is first in line in the direction of airflow. It is attached to the back plate (401), which is now in between the rotating wheel (403) and the inlet cone (402). The fan wheel (403) is then positioned to mate with the back plate (401) through the non-contacting labyrinth seal (414) created by features formed into the back plate (401) and the fan wheel inlet plate (410) illustrated in the section view drawings of FIG. 12, FIG. 13, and FIG. 14. The changed position of the back plate (401) is advantageous to the positioning of the labyrinth seal (414) which will be discussed in more detail later.

Figure 9:
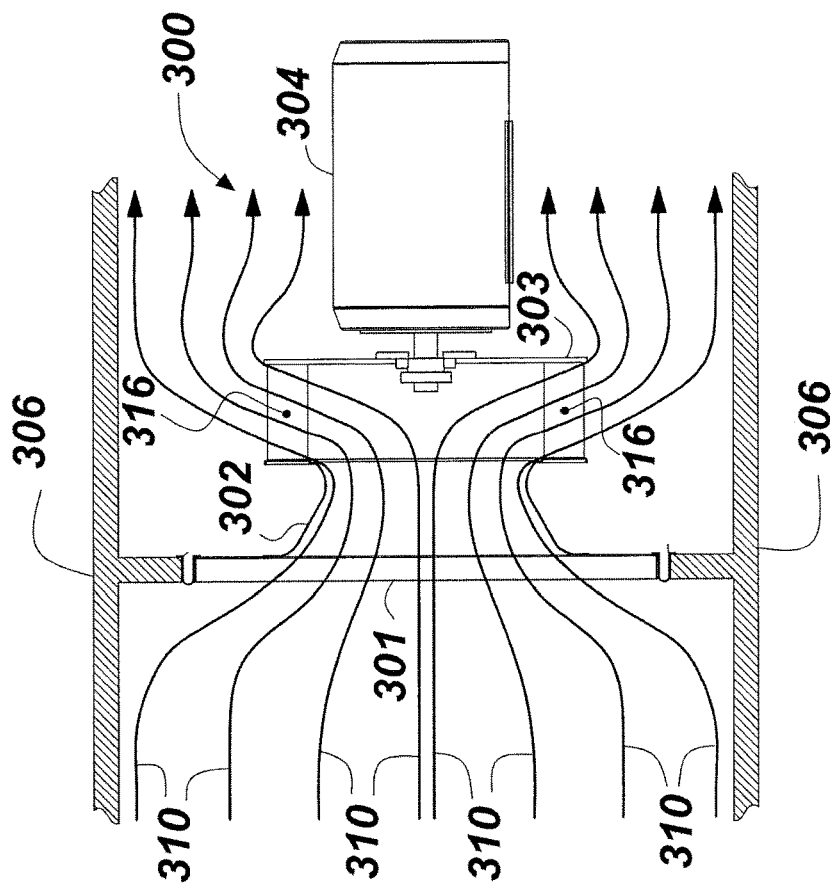
FIG. 9 is a section view of the fan in FIG. 4 showing the flow pattern in a prior art direct driven single width single inlet plenum fan installed in an air handling unit cabinet.
Figure 9:
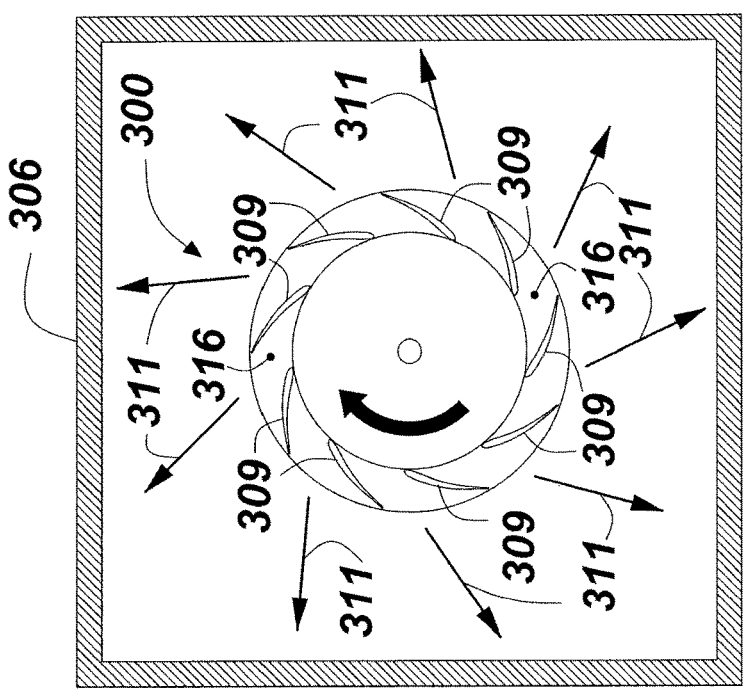

The second significant difference is the shape of the rotating fan wheel (403). The fan wheel (303) of the prior art plenum fan (300) consists of a plurality of fan blades (309) positioned radially about the axis of rotation and sandwiched between a flat inlet plate (308) and a flat outlet plate (307). These fan blades are positioned in a backwardly inclined position, as illustrated in FIG. 9. The wheel inlet plate (308) has an opening formed into it to allow the insertion of the inlet cone (302). The plurality of air channels (316) formed between the fan blades (309), the inlet plate (308), and the wheel outlet plate (307) directs the air radially outward from the axis of rotation and perpendicular to the direction of flow at the fan inlet. The back plate (307) is flat and is attached to the shaft of the motor (304) which drives the rotation of the fan wheel (303).

Figure 14:
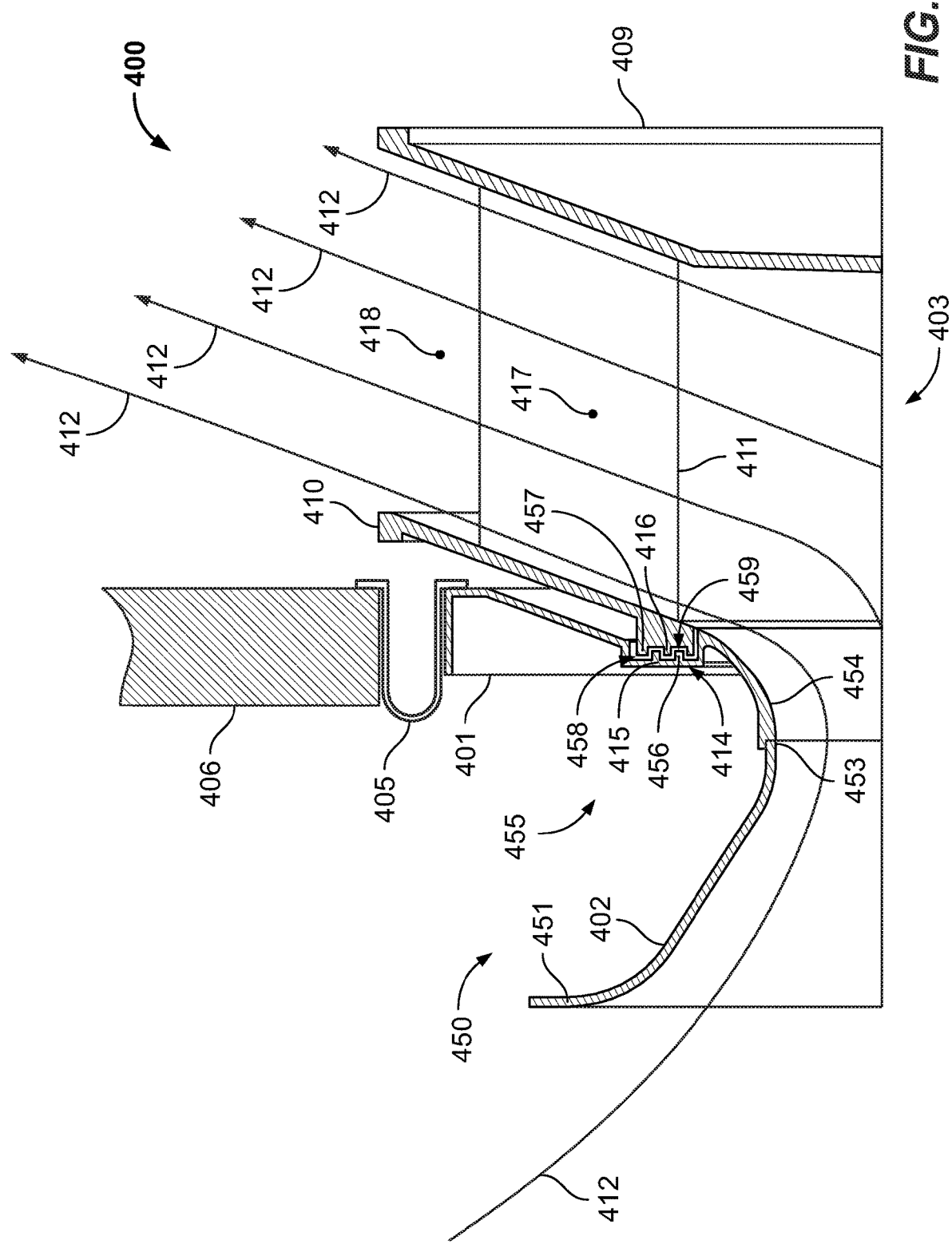
FIG. 14 is a further enlargement of the section view of FIG. 13 showing the details of the rotating labyrinth seal.

The shape of the fan wheel (403) of the current invention is markedly different than that of the shape of the prior art fan wheel (303). Instead of being flat, both the wheel inlet plate (410) and the wheel outlet plate (409) are formed in the shape of a cone. As shown in FIGS. 13 and 14, each of the wheel inlet plate (410) and the wheel outlet plate (409) includes a side wall that is disposed opposite of the other side wall and is inclined at an angle away from the fan inlet (450). A plurality of fan blades (411) is positioned radially about the axis of rotation and is disposed or sandwiched between the cone-shaped inlet plate (410) and cone-shaped outlet plate (409). The plurality of air channels (417) formed between the fan blades (411), the wheel inlet (410) and the wheel outlet plate (409) are tilted forward into the direction of airflow at the fan inlet by the angle of the cone shape of the wheel inlet (410) and wheel outlet plate (409). This forward tilt of the air channels (417) provides for improved flow which shortly will be discussed in more detail. The outlet plate (409) is attached to the shaft of the motor (404) which drives the rotation of the fan wheel (403).

Figure 15:
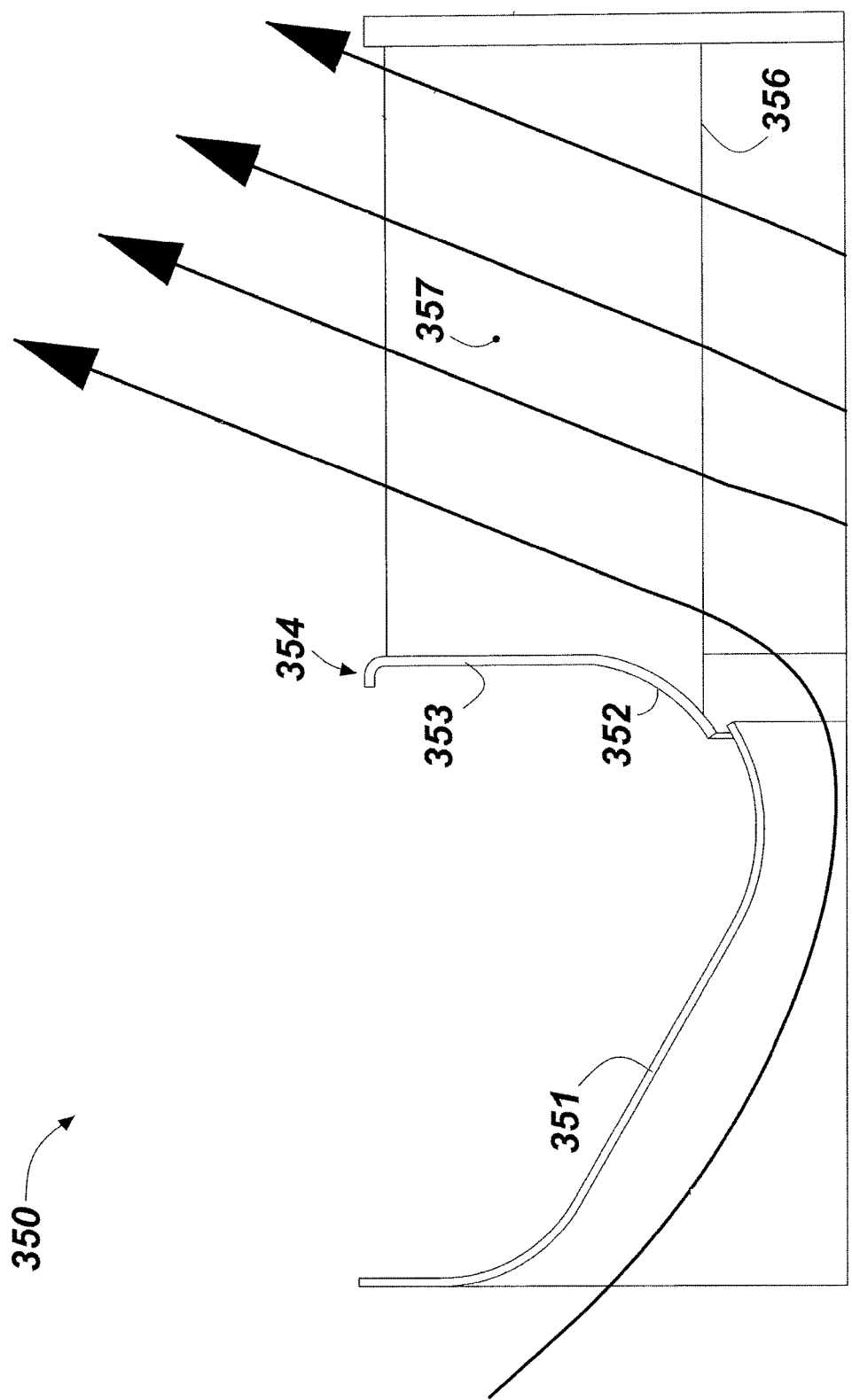
FIG. 15 is a detailed section view of a prior art plenum fan wheel and cone showing an alternate shape of the fan wheel inlet plate that incorporates a curved section at the air entry opening.

It should be noted that the diagrams in FIG. 3, FIG. 4, FIG. 9, FIG. 10, and FIG. 11 show the construction of a prior art plenum fan (300) with a completely flat fan wheel inlet plate (308). This is the common construction technique for most of the high efficiency plenum fans sold in the United States today. Other shapes of this inlet plate have been used. Some prior art plenum fans (350) incorporate a curved shape (352) at the inner edge of the wheel inlet plate (354) as shown in the section view of FIG. 15. This curved shape (352) acts as a continuation of the shape of the inlet cone (351) and the fan blades (356) are usually formed to fit seamlessly along this curved shape. In most cases of prior art plenum fans the curved shape (352) eventually flattens out (353) creating radially outward flow channels (357) similar to those shown for the prior art plenum fan (300) with a completely flat fan wheel inlet plate (308). The tilted forward flow channels (417) of the current invention differ from this in that both the wheel inlet plate (410) and the wheel outlet plate (409) are tilted forward to form forward flowing channels (417) about the fan wheel blades (411). These forward flowing channels (417) have advantages for a plenum fan that we will discuss now.

As stated earlier, plenum fans were developed by removing the housings from housed single width single inlet centrifugal fans. Many fan manufacturers still use the exact same fan wheel and inlet cone design for their plenum fans that they use for their housed single width single inlet (SWSI) centrifugal fans. The flow characteristics in the wheel changed when the housing was removed. It is useful to explain how the flow was altered when the housing was removed to explain the benefits of the current invention.

Figure 8:
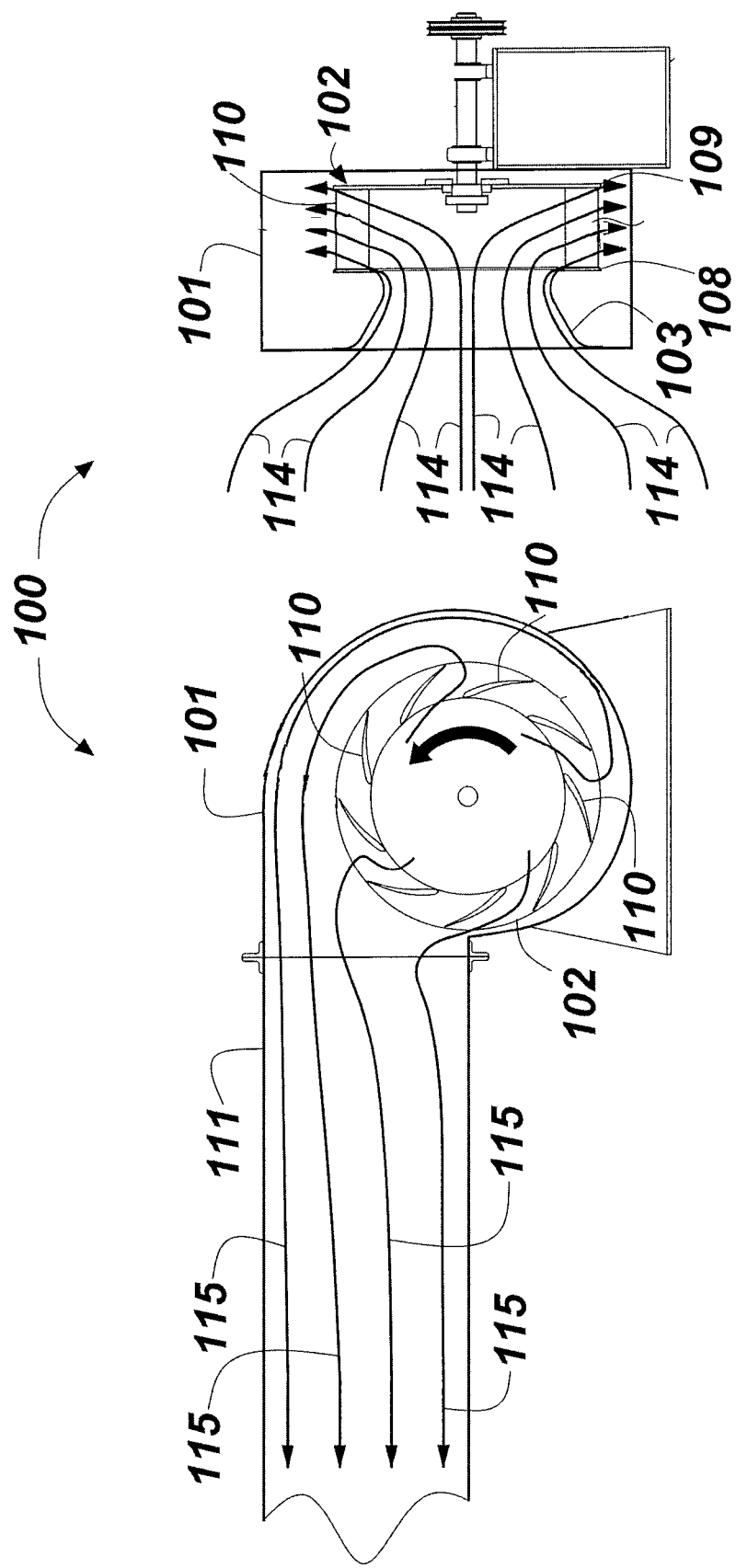
FIG. 8 shows the flow patterns in a prior art single width housed belt driven centrifugal fan with an outlet duct connected.

FIG. 8 shows two section views of prior art SWSI fan (100) with flow lines drawn in to show how the air moves through the fan. Since these fans are designed to be ducted and the outlet duct affects the fan performance, the fan section is shown with an outlet duct attached. The view on the right is a section view through the center of the fan wheel (102). The flow lines (114) enter the fan from a plenum space through the inlet cone (103). The air accelerates through the cone and reaches a maximum velocity at the minimum section of the inlet cone (103). From there the air expands into the fan wheel (102) where it is pulled through the wheel by the centrifugal forces acting on the air in the air chambers formed between the fan blades (110) and the wheel inlet plate (108) and wheel outlet plate (109). The air is ejected into the housing at high velocity and is contained by the fan housing (101). The centrifugal action of the wheel changes the direction of the flow from an axial direction to a radial direction about the fan axis of rotation. Because of this direction change and the high momentum of the air as it passes through the minimum section of the inlet cone, the flow of the air is not completely radial as it passes through the fan blades (110) as shown by the flow lines (114). Because the wheel outlet plate (109) is very close to the closed side of the housing (101), the air leaving the wheel is forced to stay in a radial direction as it exits the fan wheel.

The left view is a section view through the fan wheel (102), fan housing (101), and outlet duct (111) looking at the wheel inlet. This view shows how the air interacts with the housing after it leaves the rotating fan wheel (102). The flow lines (115) show how the air passes through the wheel (102) and is collected by the fan housing (101) and forced into the outlet duct (111). The housing (101) is shaped in an expanding volute around the outer diameter of the fan wheel (102) in a way that allows the air to gradually expand as it flows around the volute and into the outlet duct (111). This gradual expansion allows the fan to convert most of the momentum energy of the high velocity air exiting the fan wheel (102) from velocity pressure to static pressure as it is forced into the lower velocity outlet duct (111). This effective conversion from velocity energy to static pressure improves the static efficiency of the fan which is why these fans are usually more efficient than the corresponding prior art plenum fan (300).

Figure 10:
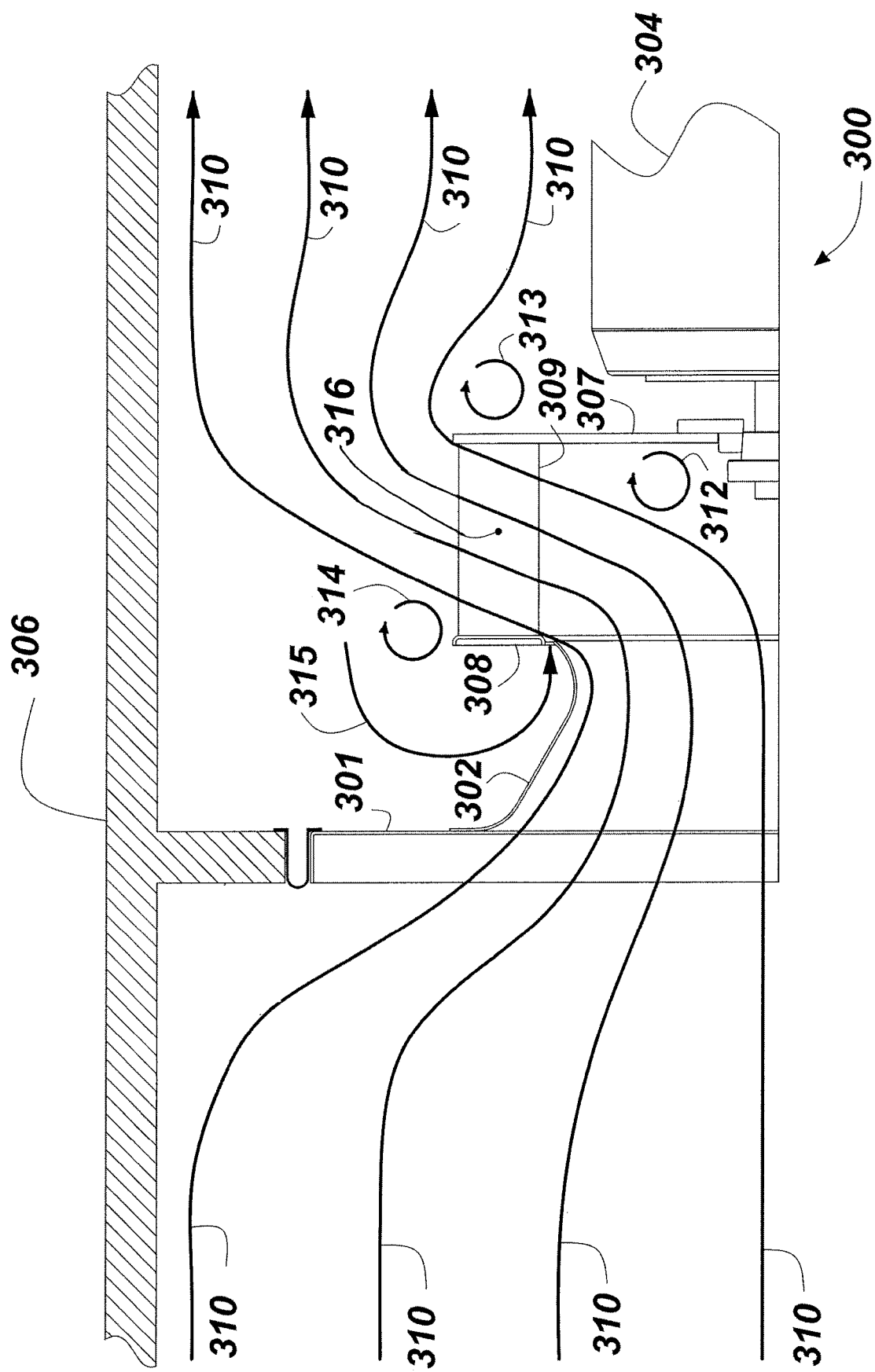
FIG. 10 is an enlargement of the section view of FIG. 9 to show the areas of turbulence and the air recirculation through the gap between the rotating wheel and the inlet cone.
Figure 11:
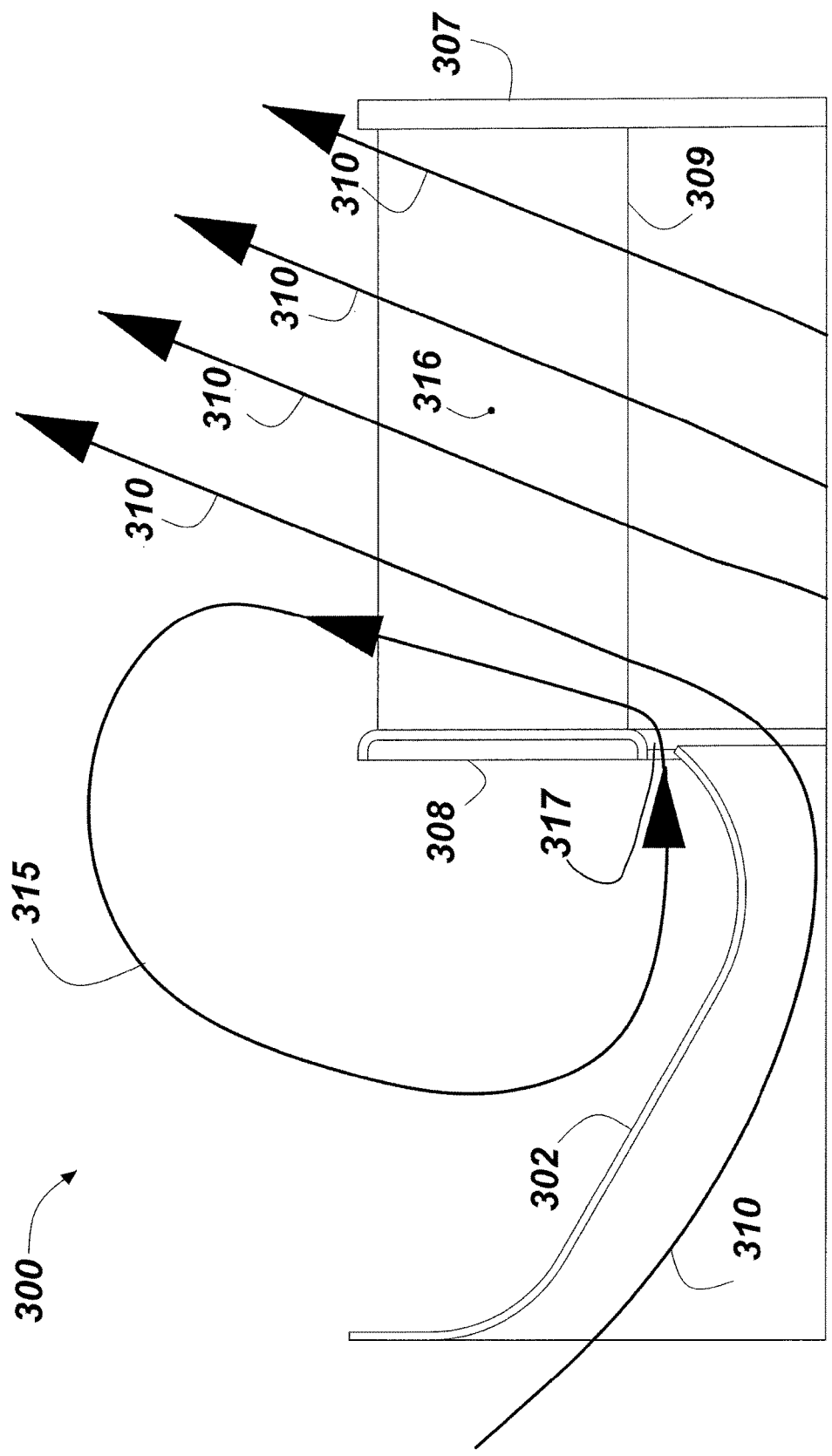
FIG. 11 is further enlargement of the section view in FIG. 10 detailing the air recirculation through the gap between the rotating wheel and the inlet cone.

In contrast, FIG. 9, FIG. 10, and FIG. 11 show the flow through a prior art plenum fan. FIG. 9 shows two section views of a prior art plenum fan (300). The left view shows a section through the middle of the fan wheel (303) looking at the wheel from the motor side. The flow lines (311) are all exiting the fan radially. Without a housing to direct the flow, the air exits in a rather uniform fashion and expands out in this direction to fill the limits of the housing (306).

The right view is a sectional view through the center of the fan wheel (303). The flow lines (310) enter the fan from the inlet plenum through the inlet cone (302). The air accelerates through the cone and reaches a maximum velocity at the minimum section of the inlet cone (302). From there the air expands into the fan wheel (303) where it is pulled through the wheel by the centrifugal forces acting on the air in the air chambers (316) formed between the fan blades (309) and the wheel inlet plate (308) and wheel outlet plate (307). The air is ejected from the fan wheel (303) at high velocity where it rapidly diffuses into the outlet plenum and loses velocity. This loss of velocity momentum is not gradual or well controlled, so most of the momentum energy or velocity pressure is lost by conversion to heat and results in lower than optimum static efficiency for the fan (300). Because there is no housing to keep the air flowing in a radial direction and the air handling cabinet (306) directs the air to continue moving in a direction parallel to the axis of rotation, the tendency to shift the flow pattern in a forward direction as it passes through the fan blades (309) is accentuated. This tendency toward forward flow is shown by the flow lines (310).

FIG. 10 is a more detailed view of the right section of FIG. 9 showing only the flow through the upper half of the wheel. The view shows areas of turbulence caused by the less than uniform nature of the air flowing through the chambers formed by the area between the fan blades (309). The turbulence (313) as the air exits the wheel at the downstream side of the wheel is great and is caused by the high exit velocity passing over that edge of the wheel in the forward direction. Turbulence increases the amount of noise the fan produces and reduces the fan efficiency. Reducing areas of turbulence will decrease fan noise and increase fan efficiency, both desirable results. Other areas of turbulence (312 & 314) exist in the voids caused by an absence of flow due to the tendency towards forward flow. The angle of this forward flow from the plane normal to the axis of rotation of the fan wheel (303) ranges from 15 degrees to 35 degrees depending on the flow through the fan (300) and the fan wheel design.

FIG. 11 is an enlarged view of FIG. 10 showing the air bypass (315) through the gap (317) caused by the difference in diameter between the inner diameter of the fan wheel inlet plate (308) and the outer diameter of the inlet cone (302) at its exit. This gap is relatively small, but the pressure differential between the air inside the fan and outside the fan is very great at this point. This velocity of the air on the inside of the fan is very near to its maximum value at this point. It can be as high as 10,000 to 20,000 feet per minute. The corresponding velocity pressures are 6 to 25 inches of water column respectively at standard atmospheric conditions. Since this velocity energy comes from converting the static pressure at the inlet of the fan to velocity pressure, the static pressure must be less than the pressure at the inlet of the fan (300) by at least those values. In other words, a pressure probe measuring between the fan inlet and the air inside the fan at this air gap would measure negative 6 to 25 inches of water column. The purpose of the fan is to generate flow and positive pressure between the inlet and the outlet. Plenum fans of this type can generate positive static pressures that exceed 12 inches of water column. The pressure difference across this gap can be as large as 35 inches and is routinely in the range of 15 to 20 inches of static pressure. This gap is in the range of 0.06 inches to 0.18 inches for fan wheels with diameters ranging from 12 inches to 30 inches. These small gap sizes are like an open door when exposed to these large pressure differentials. As much as 2% to 5% of the fan airflow can bleed back through this gap depending on the operation conditions. The velocity jet passing through the gap is very high and contributes to the turbulence (314) in the dead area on this side of the wheel and contributes greatly to the noise generated by the fan during operation. The high bleed back air volume reduces the efficiency of the fan by an amount equal to the percentage it represents of the total air volume of the fan.

Figure 12:
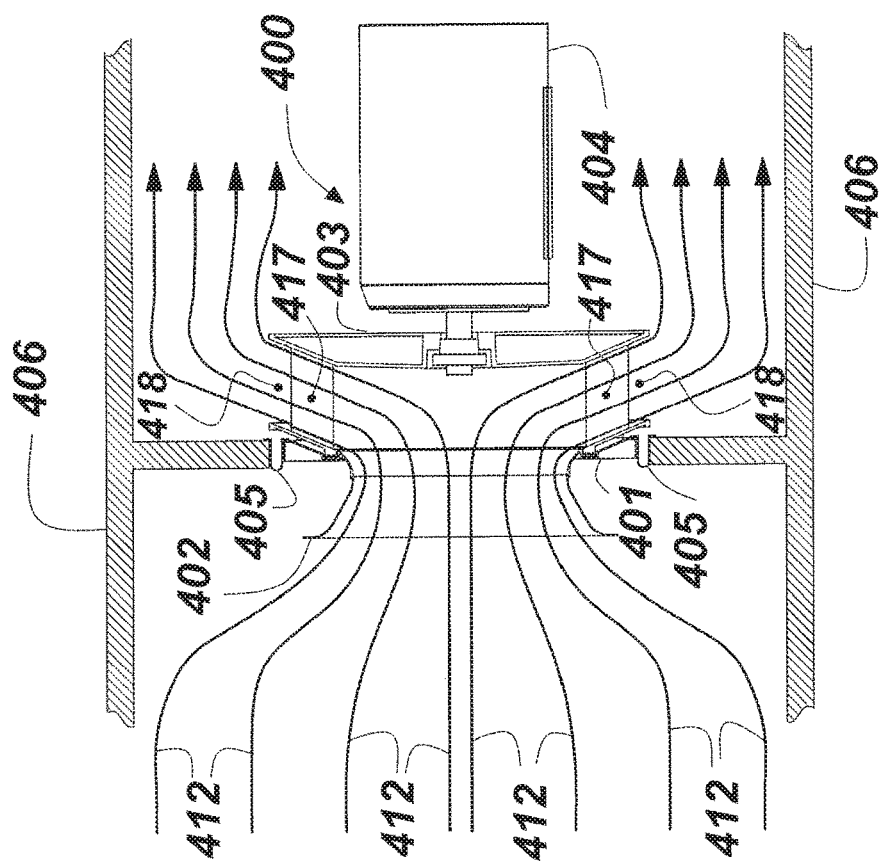
FIG. 12 is a section view of the fan in FIG. 5 showing the improved flow pattern in the improved fan of this invention.
Figure 12:
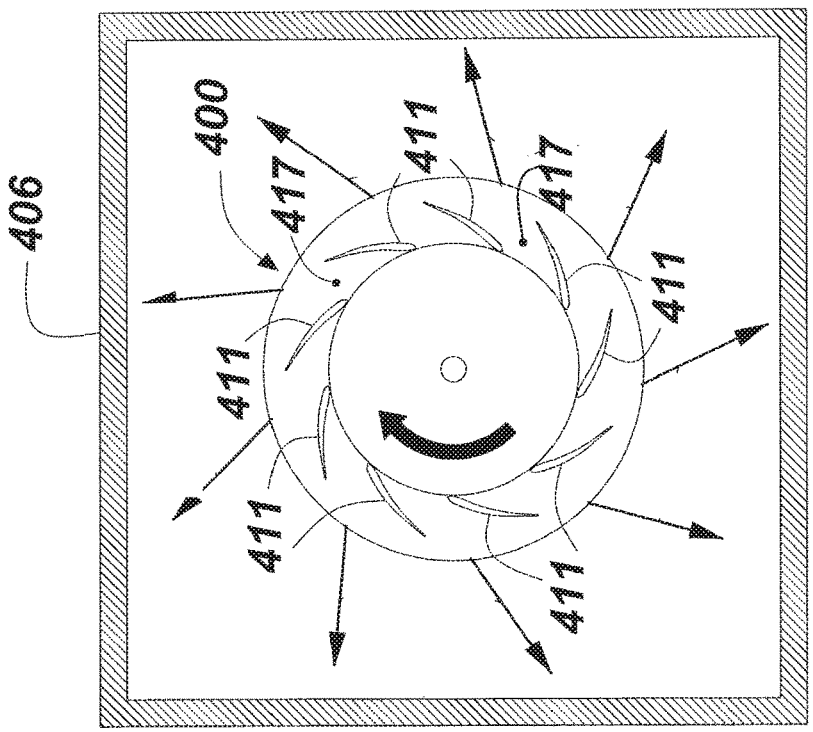

The improved plenum fan (400) of the present invention reduces the turbulence and air bypass of the prior art plenum fans (300). FIG. 12, FIG. 13, and FIG. 14 illustrate the improved flow patterns of the preferred embodiment. FIG. 12 shows two section views of the preferred embodiment plenum fan (400). The left view shows a section through the middle of the fan wheel (403) looking at the wheel from the motor side. The flow lines (412) are all exiting the fan radially. Without a housing to direct the flow, the air exits in a rather uniform fashion and expands out in this direction to fill the limits of the housing (406) in a very similar fashion to the prior art plenum fan (300). This is a desirable feature because it promotes uniform air velocity downstream of the fan which gives plenum fans many advantages when used in air handling unit applications.

The right view is a section through the center of the fan wheel (403). The improved flow lines (412) enter the fan from the inlet plenum through the inlet cone (402). The air accelerates through the cone and reaches a maximum velocity at the minimum section of the inlet cone (402). From there, the air expands into the fan wheel (403) where it is pulled through the wheel by the centrifugal forces acting on the air in the air chambers (417) formed between the fan blades (411) and the wheel inlet plate (410) and wheel outlet plate (409). The air then passes into the outlet diffuser space (418) formed by extending the wheel inlet plate (410) and the wheel outlet plate (409) past the outside edge of the fan blades (411). In this space the air is allowed to expand in a gradual and controlled manner and convert some of the velocity pressure lost by prior art plenum fans into static pressure and thereby improve the efficiency of the fan.

The flow in the fan is improved because the air chamber (417) is formed by the shape of the conical fan wheel inlet plate (410), and the conical fan wheel outlet plate (409) allows the air to flow smoothly in the forward direction that it wants to flow due to the momentum forces previously described. This shape eliminates the areas of high turbulence by eliminating the sharp edge the air must pass at the exit and minimizing the areas void of airflow.

The air bypass and the efficiency loss and noise that result from it are greatly reduced by the labyrinth seal (414) in the preferred embodiment of the present invention. This seal is created by the shape of a stationary part or portion (415) formed in the stationary fan back plate (401) and the corresponding shape of a mating part or portion (416) formed on the rotating fan wheel inlet plate (410). As shown in FIG. 14, the stationary part (415) defines fingers or teeth (456) and the mating part (416) defines fingers or teeth (457) that interlock with each other in a manner that increases the flow path distance and resistance that the air must pass through to bypass from the fan outlet plenum to the inside of the wheel at the point of the rotating air gap. FIG. 14 shows that each of the teeth (456) is formed from a respective axially- and forwardly-extending annular wall of the stationary part (415) and each of the teeth (457) is formed from a respective axially- and rearwardly-extending annular wall. FIG. 14 also shows a series of u-shaped concentric grooves (458) defined by the teeth (456) in such a manner that each of the grooves (458) is separated from another of the grooves (458) by one of the teeth (456). A plurality of u-shaped concentric grooves (459) are defined by the teeth (457) in such a manner that each of the grooves (459) is separated from another of the grooves (459) by one of the teeth (457). As the wheel rotates at high speed the teeth (457) of the mating part (416) that are formed into the fan wheel inlet plate slide in the grooves (458) of the stationary part (415) formed into the fan back plate (401) at great velocity. This velocity induces air movement in the grooves that is perpendicular to the direction that the bypass air must flow which further reduces the amount of air bypassed through this seal.

In the preferred embodiment of this invention the stationary part (415) of the labyrinth seal (414) is formed into the fan back plate (401) because it is convenient and cost effective to do so. That is one of the reasons why it is desirable to have the fan back plate (401) located after the fan inlet cone (402) instead of before it as it is in prior art plenum fans (300). Additionally, as shown in FIG. 14, the diverging air expansion portion (454) extends from the stationary part or portion (415) of the labyrinth seal (414) and is connected to and downstream from the fan inlet cone (402). It is not necessary for the stationary part of the labyrinth seal to be in the fan back plate to be effective. Other embodiments may form this part into the inlet cone (402), and it will function just as well.

Another reason to move the fan back plate (401) downstream of the inlet cone and place it between the inlet cone and the rotating fan wheel as it is in the preferred embodiment is to reduce the installation cost of piezometric measurement of the fan air flow. Heinz Wieland, in his EU patent application 90114296.8, detailed how a simple, highly accurate air flow measurement system could be created by installing a pressure tap at a fixed location along the contour of the inside surface of the inlet cone. By measuring the static pressure depression between the air entering the inlet cone and this pressure tap, the air volume flowing through the fan can be accurately determined by using the calculation methods he disclosed.

Figure 7:
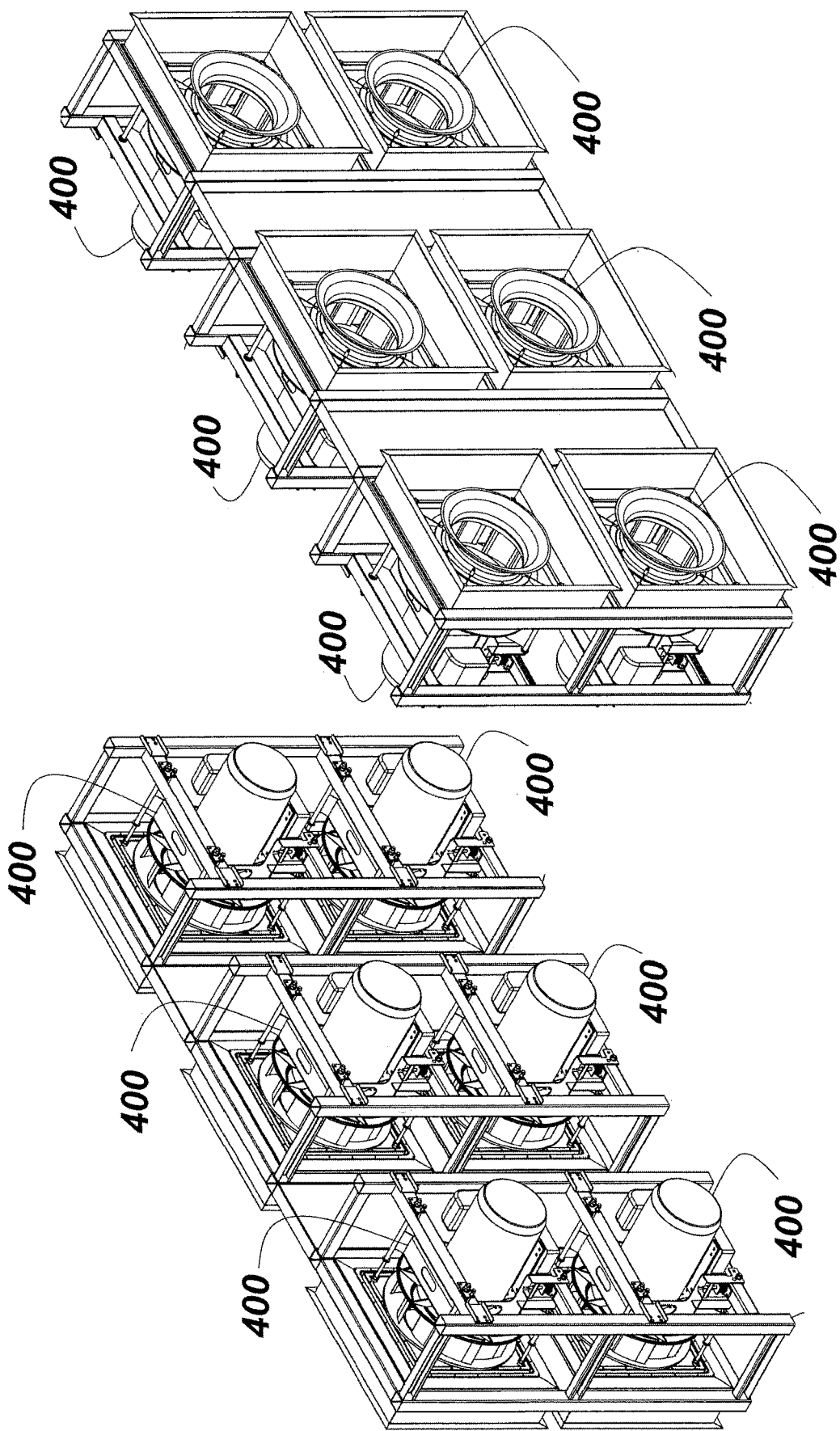
FIG. 7 is a 2×3 plenum fan array shown from the air inlet side and the air outlet side. This drawing shows an array with the improved direct driven plenum fans.

This method of flow measurement has become very popular for use with plenum fans and particularly popular when the plenum fans are used in fan arrays. An example fan array is shown in FIG. 7. In prior art plenum fans it is necessary to pipe at least one pressure port through the fan back plate (301) in order to make the measurement required to calculate the flow. The pressure port at the fixed location on the inlet cone is formed by drilling a hole through the inlet cone and attaching by some mechanical means a tube or conduit to transmit the low pressure back to the low side of a differential pressure gauge or sensor. The high side of the differential pressure gauge or sensor must be connected to sense the pressure of the air in the inlet plenum before it enters the inlet cone. When the fan back plate (301) is located before the inlet cone (302) as it is in prior art plenum fans (300) it is necessary to port a pressure tube or conduit through the fan back plate (301) to accomplish this measurement. One could locate the differential pressure sensor in the downstream plenum and connect the low pressure side to the pressure tap with a tube or conduit. The tube or conduit would have to be connected to the high pressure port of the sensor or gauge and run through the fan back plate (301) in order to sense the upstream pressure.

Alternately, the differential pressure sensor or gauge could be located in the upstream plenum and the high pressure port left unconnected so that it would sense the upstream plenum pressure before the air entered the inlet cone (302). In this case a conduit or tube would have to be connected to the pressure tap on the inlet cone and to do so the conduit or tube would have to pass through the fan back plate (301) to make the connection. So in either location of the pressure sensor or gauge a tube or conduit would have to be routed through the fan back plate (301) if it is located before the fan inlet cone (302) as it is in prior art plenum fans.

In contrast, by moving the fan back plate (401) after the fan inlet cone (402) as it is shown in the preferred embodiment of this invention the pressure sensor or gauge could be mounted on the entering air side of the fan back plate (401). The connection to the fixed pressure tap on the inlet cone would also be on the entering air side of the fan back plate (401) so a simple and short tube or conduit could be connected to the low side of the differential pressure gauge or sensor without passing through the fan back plate (401). This greatly simplifies the installation of this device and reduces the cost. This is particularly important in fan array applications of the present invention, because it is desirable to put flow measurement on all of the fans in the fan array to get the most accurate flow measurements. Small cost savings on each individual fan can add up to large cost savings for the entire fan array. Accurate flow measurement is increasingly important to implement modern building energy savings strategies.

As stated earlier, fan arrays, such as the one shown in FIG. 7, have brought the benefits of direct drive fan systems to large industrial systems. As such they almost always employ direct drive fans and also always use variable speed drives (VSD) to control the speed of the motors. The VSD is not only used to control the airflow of these systems, it is also typically used to set the design or maximum speed as well. In prior art systems the motor is usually selected to run at a speed higher than its synchronous speed in order to achieve the design or maximum performance.

Figure 16:
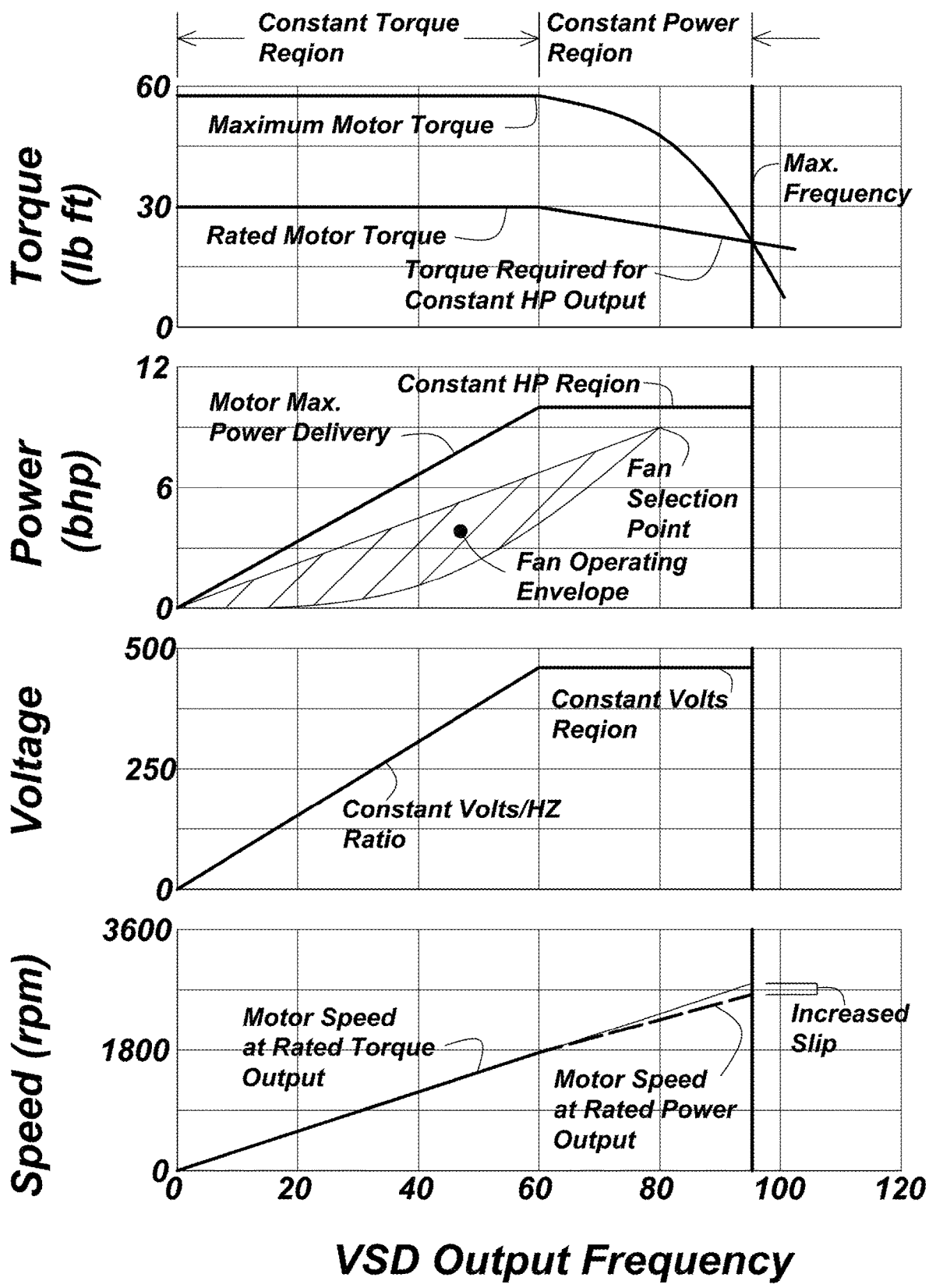
FIG. 16 shows four graphs, one each plotting torque, power, voltage, and speed verses the VSD output frequency.

FIG. 16 shows how the fan motor and the VSD work together. FIG. 16 shows the performance parameters of a 4 pole, 3 phase induction motor rated at 10 HP, 460 Volts and 1760 rpm.

The amount of torque a motor delivers is a function of the load imposed on it. The torque that any given motor delivers is a function of the motor slip and the volts/hertz ratio provided by the power supply, which in this example is a VSD. The volts/hertz ratio is an important operating parameter of the motor that will be discussed in detail shortly.

The slip is the difference between the rotating field of the motor and the actual rotor speed of the motor. The rotating field speed is often called the synchronous speed of the motor. The synchronous speed of a motor is a function of the AC power frequency and the number of poles built into the motor and can be calculated with the following formula:

Synchronous Speed=120×Power Frequency/number of poles in the motor

The power frequency is in hertz and the Synchronous Speed is in rpm. In the case of our example motor, the synchronous speed is 1800 rpm at its design condition of 60 hertz. Since the motor is rated to deliver its design power at 1760 rpm the slip is then 40 rpm. The motor is typically rated in horsepower, not torque but the two are related as shown by the following formula:

Motor Power Output=Torque×Motor Speed/5252

The Motor Power Output is in horsepower (HP). The motor speed is in rpm and the torque is in lb-ft. For our example unit, the motor rated torque output is 29.84 lb-ft.

If the load on the example motor is exactly 10 HP at 1760 rpm, the motor will turn at 1760 rpm. If the load on the example motor requires less than 10 HP at 1760 rpm, the motor speed will increase (the slip will decrease) until the torque output of the motor matches the load. If the load requires more than 10 HP, the motor speed will slow down (the slip will increase) until the motor produces enough torque to meet the load. This would result in an overloaded condition on the motor, and the winding temperature would increase and the motor current would rise above the rated full load amps (FLA). For these reasons, overloading the motor is not recommended. It does point out that slip is an indication of motor loading and that the slip is small, relative to the motor synchronous speed, on modern three phase induction motors. This makes the speed of the motor nearly proportional to the output frequency of the VSD.

There are 4 separate graphs on FIG. 16. There are graphs of Torque, Power, Voltage, and Speed verses the VSD output frequency. The graphs are broken into two regions, the "Constant Torque Output" region and the "Constant Power Output" region.

From 0 hertz to the full motor frequency rating, the VSD will adjust voltage to the motor as its output frequency rises. That is from 0 hertz to 60 hertz for the example motor. The VSD will not allow the volts/hertz ratio to exceed the design ratio of the motor. In the case of the example motor, the volts/hertz ratio is 7.67. This means that at a VSD output frequency of 30 hertz, the drive output voltage will not exceed 230 VAC. This is important because if the motor sees higher voltage than that it will saturate, overheat and eventually fail. If the drive delivers a constant volts/hertz ratio as it varies the output frequency from the motor design frequency down to 0 hertz, the motor will be capable of delivering its full design torque at any point in this range. This is called the "Constant Torque Output" region. It is important to note that, if the motor load requires less than the design torque of the motor, the voltage can be decreased by the VSD. This is often done by special algorithms in the VSD to improve motor efficiency at low loads. This is especially important with fans because their torque requirements fall off exponentially as the fan speed is lowered.

The Torque curve of FIG. 16 has two lines: the first is the rated motor torque line, and the second is the maximum motor torque line. The maximum torque line is a function of the motor design, and is generally a multiple of the motor rated torque. Both of these torque values are constant as long as the drive maintains the constant volts/hertz ratio. When the VSD hits the motor rated frequency, it must deliver the rated voltage to the motor to keep the volts/hertz ratio constant. The way VSD's are customarily applied with motors, the rated voltage of the motor is also the line voltage input to the VSD. The VSD does not have the capability to deliver voltage to the motor in excess of the line voltage. Consequently, if the frequency delivered to the motor exceeds the motor design frequency, the volts/hertz ratio drops. As stated earlier, when the volts/hertz ratio to the motor is lower than the torque, capability of the motor lowers. Fortunately, when the motor runs faster than the design speed, it requires less torque to supply the rated power of the motor. As seen from the torque curves, the maximum motor torque drops off faster than the torque required for constant power. The point where these two curves cross is at the maximum frequency the motor can deliver the full rated power. The frequency range between the motor rated frequency and this frequency is called the "Constant Power Output" region.

The maximum frequency varies on modern premium efficiency 60 hertz motors. It will range from 90 hertz to 110 hertz depending on the overall motor torque capability.

The power curve shows that the maximum motor power output varies proportionally in the constant torque region and is constant in the constant power region. The motor can operate safely as long as it delivers less power than bounded by these curves.

The voltage curve shows the motor voltage varies proportionally with the frequency in the constant torque output region. This is what allows the motor to deliver constant torque. In this region, the voltage represented by the curve is also the maximum voltage that the VSD can supply to the motor. The motor current draw in this region will be a function of the torque required by the load. At full design torque, the motor will draw its rated full load current when the volts/hertz ratio is constant. If the load requires less torque the motor will draw less current. At low torque loads, the VSD will often decrease the voltage to the motor below the constant volts/hertz line. This keeps the motor current up and reduces the magnetic core loss, which increases the motor efficiency at low loads. In the constant power region, the curve shows that the voltage remains constant at the maximum voltage output of the drive. In this region, the motor current draw will be a function of the power required by the load. When the motor delivers full rated horsepower in this region, it will draw its rated full load current. At lower power demand, it will draw less current.

The speed curve shows that the motor speed varies proportionally with frequency when it delivers rated torque in the constant torque region. It continues to rise at a slightly lower slope in the constant power region where it delivers constant power. The slope is slightly lower because the motor needs more slip to deliver the necessary torque in this region.

Prior art direct drive fans used in fan arrays are commonly selected so the motors run in the constant power region at the full load or design condition of the fan. This is because the motor does not need to be de-rated when operating in this region. If the motor is selected to run in the constant torque region it might take a larger motor to meet the power demand. This would add additional expense for the motor and associated electrical service. The motor would be heavier making it harder to spring isolate.

Fans are always selected at the maximum required flow and pressure for the application it will be used for. As long as the motor is selected so that the fan power draw at the required fan speed is within the operating envelope of the motor it will remain within that envelope. The power curve of FIG. 16 shows a typical operating envelope of a direct drive fan motor. In this example the fan requires 9.0 bhp at 2250 rpm. This corresponds to a motor frequency of 80.0 hertz. As the power curve shows, this operating point is well within the power capability of the 10 horsepower motor of our example. The VSD would be set up so that the maximum frequency output is 80 hertz. In that way the power required to drive the fan will never exceed the design power draw. The hatched area shows the potential operating range that the fan could impose on the motor. It is bounded on the lower edge by a curve that varies with the cube of the fan speed. This represents the minimum load that this fan might impose on the example motor. This would simulate a system where the air distribution system had a fixed resistance to airflow. In this case the pressure rise of the fan would be reduced by the square of the ratio of the operating speed to full load speed and the flow would be reduced by the direct ratio of those speeds. The operating range is bounded on the top by a straight line between the power required at the design point and the zero power and zero hertz point. This would simulate a system where the pressure was constant and the flow reduced by the direct ration of operating speed to the full load speed. Actual systems will be in the hatched area because the system resistance normally is not completely fixed and the fans cannot deliver full pressure as the speed drops off. Filters in the airflow path load up and their resistance to flow varies over time. Variable resistance devices are often installed in the air distribution system to control flow to specific zones. An example of a variable resistance device would be a variable air volume control box which is quite commonly used with modern air handling systems.

As stated earlier, motors for prior art direct drive fans are often selected in the constant power region of the motor as explained above. Both the VSD and the motor work well in this area, and the motor can deliver its full design power to the fan. It does not have to be de-rated as it would if the fan selection required the motor to run at less than its rated speed. If the motor were selected in the constant torque region it would have to be de-rated. A larger more expensive motor would have to be supplied. This larger motor would weigh more and require large electrical service to operate.

Figure 17:
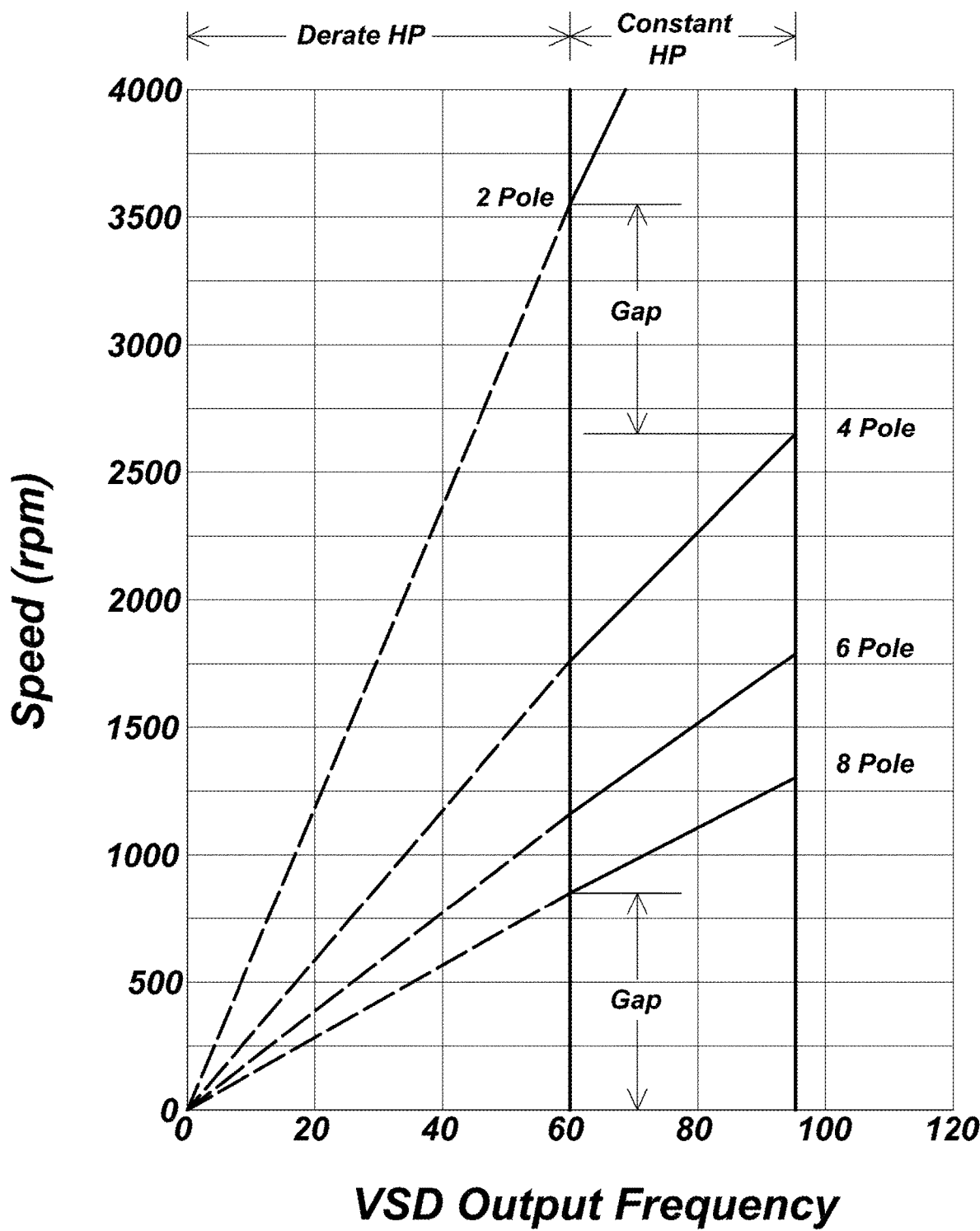
FIG. 17 shows a graph that plots 2-pole, 4-pole, 6-pole, and 8-pole motors relative to increasing VSD output frequencies.

There are some difficulties that often prevent designers from selecting motors to operate in the constant horsepower region and that add cost even at times when they can. The design fan speed requirement of a fan can vary over a large range and is driven by the flow and pressure required and the geometry of the fan selected. The range of selection speeds for common prior art plenum fans used in fan arrays varies from 400 to over 4000 rpm. There is a limited selection of motors available to the designer of the fan system. Only 2, 4, 6, and 8 pole three phase induction motors are commonly available for this application. Those correspond to motors with synchronous speeds of 3600, 1800, 1200, and 900 rpm at 60 hertz. FIG. 17 illustrates how the speed of these motors varies with the VSD output frequency and shows some of the problems designers have with their motor selections. The speeds between the motor pole options do not overlap in the desirable constant power region. There is a gap between 2650 rpm and 3550 rpm in this example. That gap is caused because the maximum speed of the 4 pole motor is 2650 and the minimum speed of the 2 pole motor is 3550 in the desirable constant horsepower region. If a fan needs to operate between these two speeds the designer must select a larger 2 pole motor de-rated and operating in the constant torque region. This gap can be reduced by producing the 4 pole motor with much more than normal torque which would increase its maximum speed but this would cause additional expense in the manufacture of the 4 pole motor. Another gap exists below 850 rpm where the designer must select and de-rate an 8 pole motor.

Other problems exist when selecting motors to drive fans in this manner. Four pole motors are the most efficient motors to use. FIG. 19 shows the minimum nominal motor efficiency required to be rated as a premium efficiency motor by NEMA MG1. The 2 pole motors are substantially less efficient than the 4 pole motors for any given motor size. This is primarily because the mechanical geometry of 4 pole motors is better than 2 pole motors. 4 pole motors are by far the most common of the 3 phase induction motors. They account for over 80% of the motors used. The efficiency of four pole motors is more important than 2, 6, or 8 pole motors to motor manufacturers and motor users so it is natural that the standard for the efficiency of 4 pole motors is a little more stringent than for the rest. 6 and 8 pole motors are uncommon, and they require a lot more torque for any give power rating. As a result they are much bigger and much more expensive than 4 pole motors.

The motor (404) used in the preferred embodiment of this invention is designed in a novel way to overcome many of the problems with using such motors to directly drive a fan. Four pole motors are the most desirable motor to directly drive a fan because of their lower cost and higher efficiency than other commonly available motors with 2, 6, or 8 poles. The motor (404) used in the preferred embodiment of this invention uses a four pole motor with the electrical windings in the stator designed to allow it to be used over the entire selection from 850 to nearly 4000 rpm.

The torque that a 4 pole motor can produce is primarily a function of the mechanical design of the motor. The amount and size of the steel laminations in the stator and rotor and the copper conductor paths in the rotor all have an influence on the amount of torque produced. The ultimate speed of the motor is also a function of the mechanical design of the motor. The bearings must be sized to withstand the speeds expected by the motor and the rotor must be strong enough to withstand the force exerted on it at its highest. The voltage rating of the motor is a function of the electrical design of the windings in the stator. The mechanical design and electrical design are separate elements of motor design. It is common for a single mechanical design to have several electrical designs associated with it. Our example 10 horsepower motor was designed for 460 volt 60 hertz power giving it a design volts/hertz ratio of 7.67. If it were supplied with electrical windings in the stator for 230 volt 60 hertz power the design volts/hertz ratio would be 3.83. It is quite common for a motor mechanical design to have several different electrical designs so that it can run on the common voltage distribution networks around the country. This characteristic of electric motor manufacture is used by the motor (404) of the preferred embodiment to make 4 pole motors that can be selected in their constant horsepower region over a much wider range of speeds than available with prior art motor selections.

The motor manufacturer has the flexibility to design the volts/hertz ratio over a wide range of values. The prior art motor uses a volts/hertz ratio of 7.67 as explained above. When used on a VFD with 460 volt supply power, the maximum voltage output of the VFD is 460 volts, and the product of the maximum output voltage times the volts/hertz ration defines the minimum frequency that full power can be delivered at, which is also the lowest frequency in the constant power region. The upper bound of the constant power region is at a minimum 1.5 times the lowest frequency or in this case 90 hertz.

With electrical windings designed for 5.11 volts/hertz the minimum frequency to deliver full power is 460 volts times 5.11 or 90 hertz. This would correspond to a rotational speed of around 2650 rpm. The upper bound of the constant power region would still be at least 1.5 times the lowest frequency or in this case 135 hertz. This motor could then deliver full power from 2650 rpm to at least 3700 rpm. This eliminates the gap that the prior art selection methods leave between 2650 rpm and 3550 rpm. This selection method has an additional advantage. A motor with a mechanical design that delivers enough torque to produce 10 horsepower at 60 hertz will be able to produce 15 horsepower at 90 hertz. This is because the torque capability is a function of the mechanical design and would be the same for both cases. Since power is proportional to torque times speed, the higher speed motor is capable of producing 50% more power at 50% more speed. Since the cost of the motor would not be significantly changed by different electrical designs, the cost per horsepower will decrease by approximately 33%. This is a significant reduction in cost while still maintaining the high efficiency of the 4 pole 10 horsepower motor.

Figure 18:
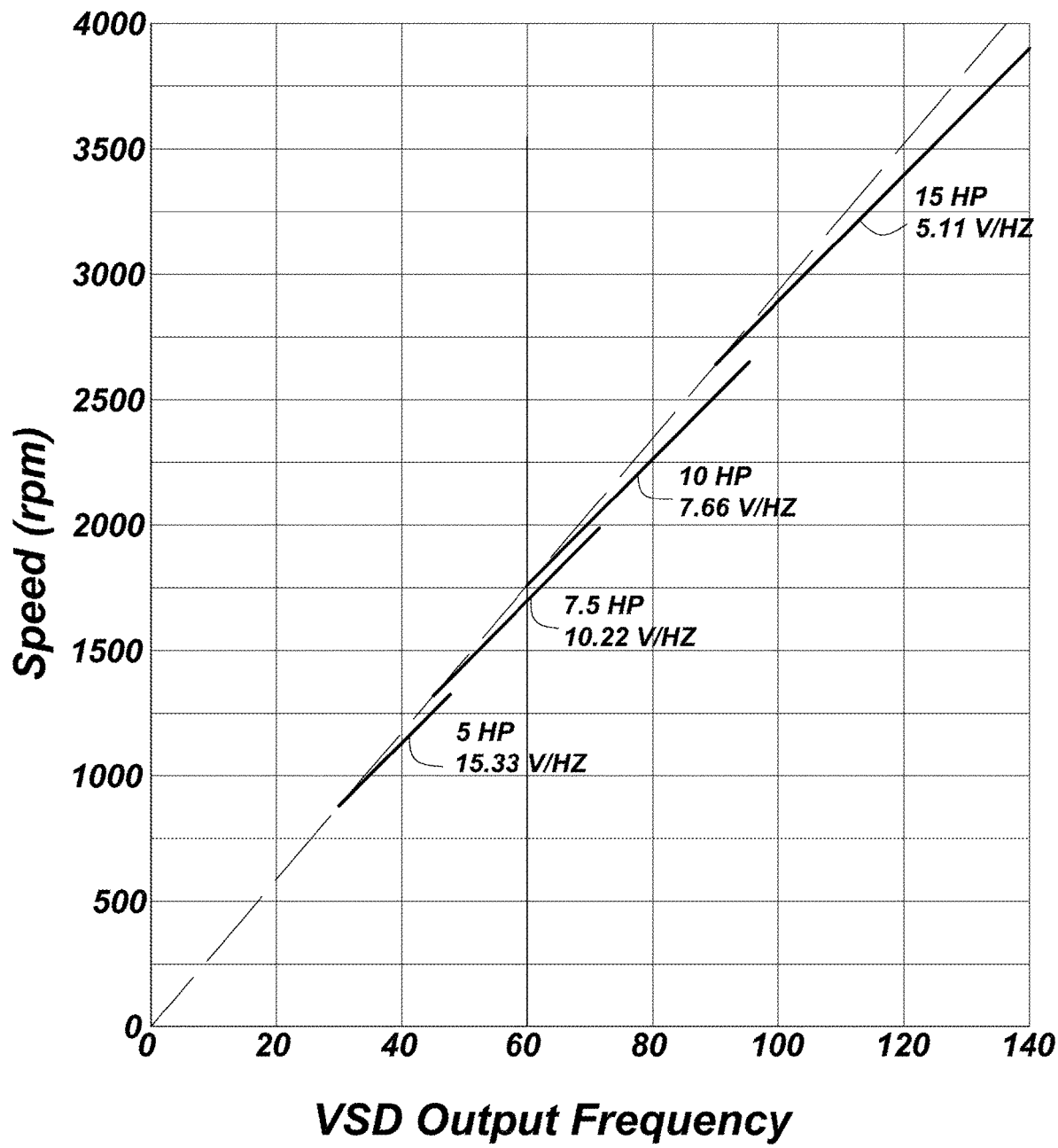
FIG. 18 shows a graph that plots 5, 7.5, 10 and 15 horsepower motors relative to increasing VSD output frequencies.

Similarly, lower speeds can be addressed by increasing the volts/hertz ratio. FIG. 18 shows the speed output of a 4 pole motor verses VSD frequency delivery to the motor. The volts/hertz ratios shown are for VSDs on a 460 volt power distribution system, and the dark lines show the frequency verses speed range for the constant power selection region of each motor winding option. The motors designed with electrical windings for the lower speeds would have the disadvantage that they would deliver less power than the higher speed motors. As shown in FIG. 17, the motor with windings designed for 10.22 volts/hertz could only deliver 7.5 horsepower between 1350 to 2000 rpm. Similarly, the motor with windings designed for 15.33 volts/hertz can only deliver 5 horsepower between 850 to 1400 rpm. Though these lower speed 4 pole motors would cost more per horsepower than the 10 horsepower motor, they will cost less than equal power 6 and 8 pole motors with the same range of constant power speeds. They will also have similar efficiency to the 10 horsepower motor which is substantially better than the equivalent 6 and 8 pole motors.

While the example was given for a motor with a mechanical design of 10 horsepower at 1750 rpm, this method of matching motor mechanical and electrical designs with the speed ranges necessary to match to specific fan design criteria will work equally well with other motor sizes, power supply voltages and motor pole designs. The preferred embodiment uses 4 pole motors because they currently offer the best performance at the lowest cost. By using this method, cost effective, highly efficient 4 pole motors can be selected with current VSD technology to drive fans from 850 to over 4000 rpm in their desirable constant horsepower range. This can be done with no gaps in the selection range.

Prior art centrifugal fans are designed to be built in families of fans. The fan manufacturer would design a range of fans that are similar in geometry. These similarities are designed to constrain all of the major design dimensions of the fans to a ratio of the outer diameter of the fan wheel. The major design dimensions would include, but not be limited to, the fan blade (309) length, the dimension between the wheel inlet plate (308) and the wheel outlet plate (307), and the length and all diameters of the inlet cone (302). The ratio of all of these dimensions to the wheel's outer diameter would be constant throughout the fan line. The fan manufacturer would also decide several distinct wheel diameters to build for his line of fans. These sizes would be selected to provide overlap and continuity of performance over the range of airflow and pressure the fan line is to cover. By doing so, the performance of all of the fans can be accurately predicted from testing done on only a select few of the fans. The performance predictions can be projected from test data by a set of similarity equations commonly known as the Fan Laws by those skilled in the art. This method is commonly used to design all modern centrifugal fan lines available today.

A problem with confining the fan geometry by these similarities exists when trying to apply centrifugal fans at low pressures. Centrifugal plenum fans, which are the subject of the current invention, are typically used to supply pressures that range from 1 inch Water Column (WC) of static pressure to over 12 inches WC of static pressure. They can cover this range quite effectively, but for any given airflow it takes a larger diameter fan to efficiently deliver air at lower pressures. This is because for any given fan size the fan must run slower to deliver less pressure and when it runs slower it delivers less airflow than it would at lower pressures. So in order to find an efficient fan at low pressure the designer must pick a larger fan than he would at higher pressures and run it very slowly. This larger fan is more expensive, and in the case of a direct dive fan, the motor gets much more expensive as has been previously discussed. Fans used for fan arrays are usually only provided in a relatively small range of sizes and models. Larger fans might not be available so more fan units might be required which will increase cost and space requirements. Often when faced with these alternatives designers choose to run the fans at less efficient areas of their operating range. Those skilled in the art know this as running the fan down the fan curve toward the wide open volume point. A centrifugal fan has 0% static efficiency at wide open volume and has its maximum or peak efficiency at somewhere around 50% wide open volume. When a fan is selected to operate closer to wide open, static efficiency is reduced.

One embodiment of the current invention addresses this problem and allows smaller fans to be used at more efficient operating points than prior art centrifugal fans for low pressures. By shortening the length of the fan blades in the fan wheel you effectively reduce the diameter of the fan wheel. The pressure a fan develops is directly proportional to the tip speed of the fan blades. By reducing the diameter of the fan wheel you will reduce the pressure it will develop at any given speed. If no other dimension of the wheel is changed the features that affect air volume flowing through the wheel are unchanged. These unchanged features would include the swept volume of the fan blades at their air inlet point, the spacing and pitch of the blades, the distance between the wheel inlet plate and the wheel back plate, and the shape and size of the inlet cone. By keeping these features constant while reducing the wheel diameter you end up with a wheel that produces more flow at low pressures and requires higher speeds. All of these are advantages for fans used for direct dive applications at low pressures. Keeping the wheel speed up allows the designer to select higher speed motors which are less costly for any given power rating. Higher wheel speeds also produce less noise in the difficult to attenuate lower frequency bands. This is very similar to the practice of trimming the diameter of a direct coupled centrifugal pump wheel in order to achieve the design head at a specific flow when the pump is run at a specific speed. It differs from that in the aspect that the wheels to be trimmed are fan wheels and the purpose is to increase the speed and flow of the fan at low pressure.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A plenum fan unit for an air handler, comprising:
   a fan inlet defining a circular converging-diverging air flow duct comprising an air flow centerline and a throat, the fan inlet comprising
   a bell-mouthed converging air inlet portion extending to and terminating at the throat, the converging air inlet portion defining a first portion of the throat;
   a mount member connected to a discharge end of the converging air inlet portion for mounting the plenum fan unit to the air handler, the mount member including
   a radially extending wall oriented transverse to the air flow centerline for mounting the plenum fan unit to the air handler, wherein the radially extending wall is positioned axially downstream of the throat,
   a stationary portion of a radially-oriented labyrinth seal extending inwardly toward the centerline from the radially extending wall, the stationary portion comprising a series of u-shaped concentric grooves arranged proximate to one another, each of the series of u-shaped concentric grooves separated by a single, axially extending annular wall defining a labyrinth seal tooth, and a diverging air expansion portion defining a second portion of the throat connected to and downstream of the converging air inlet portion, the diverging air expansion portion extending inwardly toward the centerline from the stationary portion of the radially-oriented labyrinth seal and terminating at the throat, the diverging air expansion portion adjoins the converging air inlet portion at the throat via an annular receiver positioned at an inlet end of the diverging air expansion portion;

an axial inlet, centrifugal discharge fan comprising a plurality of fan blades disposed between opposed side walls that are inclined at an angle away from the fan inlet, wherein one of the opposed side walls comprises a mating portion of the radially-oriented labyrinth seal that is configured to rotate when the fan rotates, wherein the mating portion comprises a plurality of u-shaped concentric grooves arranged proximate to one another and in a radially staggered relationship with the series of u-shaped concentric grooves of the stationary portion; and a 4-pole induction motor connected via direct drive to the fan, wherein a rotational speed of the motor is configured to be controlled by a variable speed drive (VSD).

2. The plenum fan unit of claim 1, wherein the radially extending wall extends to form a square periphery for connecting to the air handler.

3. The plenum fan unit of claim 1, wherein an inner diameter of the inlet end of the diverging air expansion portion mates with an outer diameter of the discharge end of the converging air inlet portion.

4. The plenum fan unit of claim 1, wherein the radially extending wall includes a flexible membrane extending therefrom along a periphery of the radially extending wall to close any air gaps between the radially extending wall and the air handler.

5. The plenum fan unit of claim 1, wherein the stationary portion of the radially-oriented labyrinth seal includes three u-shaped grooves and a pair of rearwardly-extending stationary labyrinth seal teeth.

6. The plenum fan unit of claim 1, wherein the mating portion of the radially-oriented labyrinth seal includes two u-shaped grooves and three forwardly-extending rotating labyrinth seal teeth.

7. The plenum fan unit of claim 1, wherein the 4-pole induction motor comprises a stator configured with windings to allow the motor to operate over a range from 850 rpm to 4000 rpm.

8. The plenum fan unit of claim 1, wherein the plenum fan unit is configured as an array of plenum fan units for the air handler.

9. A plenum fan unit for an air handler, comprising:

a fan inlet defining a circular converging-diverging air flow duct comprising an air flow centerline and a throat, the fan inlet comprising a converging air inlet portion extending to and terminating at the throat;

a mount member connected to a discharge end of the converging air inlet portion for mounting the plenum fan unit to the air handler, the mount member including a diverging air expansion portion connected to and extending downstream from the converging air inlet portion, wherein the diverging air expansion portion adjoins the converging air inlet portion at the throat via an annular receiver positioned at an upstream end of the diverging air expansion portion, the diverging air expansion portion extending downstream of the throat and away from the centerline, a stationary portion of a labyrinth seal extending radially from a downstream end of the diverging air expansion portion, and a radially extending wall oriented transverse to the air flow centerline for mounting the plenum fan unit to the air handler, wherein the radially extending wall extends radially away from a downstream end of the stationary portion of the labyrinth seal, wherein the radially extending wall is positioned axially downstream of the throat, an axial inlet, centrifugal discharge fan comprising a plurality of fan blades disposed between opposed side walls that are inclined at an angle away from the fan inlet;

a 4-pole induction motor connected via direct drive to the fan, wherein a rotational speed of the motor is configured to be controlled by a variable speed drive (VSD).

10. The plenum fan unit of claim 9, wherein the stationary portion comprises a series of u-shaped concentric grooves arranged proximate to one another.

11. The plenum fan unit of claim 10, wherein the stationary portion comprises a plurality of rearwardly-extending annular walls, wherein each of the rearwardly-extending annular walls defines a stationary labyrinth seal tooth and wherein each of the rearwardly-extending annular walls extends between adjacent u-shaped concentric grooves of the stationary portion.

12. The plenum fan unit of claim 9, wherein one of the opposed side walls comprises a mating portion of the labyrinth seal that is configured to rotate when the fan rotates, wherein the mating portion comprises a plurality of u-shaped concentric grooves arranged proximate to one another and in a staggered relationship with the series of u-shaped concentric grooves of the stationary portion.

13. The plenum fan unit of claim 12, wherein the mating portion of the labyrinth seal comprises a plurality of forwardly-extending annular walls, wherein each of the forwardly extending annular walls define a rotating labyrinth seal tooth.

14. The plenum fan unit of claim 9, wherein the 4-pole induction motor comprises a stator configured with windings to allow the motor to operate over a range from 850 rpm to 4000 rpm.

15. The plenum fan unit of claim 9, wherein the plenum fan unit is configured as an array of plenum fan units for the air handler.

* * * * *